US005604679A

United States Patent [19]

Slater

[11] Patent Number: 5,604,679

[45] Date of Patent: Feb. 18, 1997

[54] SIGNAL GENERATING DEVICE USING DIRECT DIGITAL SYNTHESIS

[75] Inventor: James C. Slater, Palo Alto, Calif.

[73] Assignee: Nomadic Technologies, Inc., Mountain View, Calif.

[21] Appl. No.: 324,520

[22] Filed: Oct. 17, 1994

[51] Int. Cl.[6] ........ G06F 17/50

[52] U.S. Cl. ........ 364/480; 364/721

[58] Field of Search ........ 364/480, 718–723, 364/569, 579, 580; 324/76.82, 76.83, 314; 332/167, 170; 380/9; 363/25; 331/4, 16; 327/106, 129, 115, 116, 121; 455/76, 260, 310; 84/659, 672

[56] References Cited

U.S. PATENT DOCUMENTS

| | | | |
|---|---|---|---|
| 4,951,004 | 8/1990 | Sheffer et al. | 331/1 H |
| 5,162,763 | 11/1992 | Morris | 332/170 |
| 5,184,092 | 2/1993 | Shahriary et al. | 331/16 |
| 5,194,684 | 3/1993 | Lisle et al. | 84/659 |
| 5,231,598 | 7/1993 | Vlahos | 364/569 |
| 5,384,845 | 1/1995 | Lopatin et al. | 380/9 |
| 5,408,687 | 4/1995 | Ooga | 445/76 |
| 5,424,667 | 6/1995 | Sakai et al. | 327/115 |
| 5,428,308 | 6/1995 | Maeda | 327/106 |
| 5,436,600 | 7/1995 | Van Heteren et al. | 332/167 |

*Primary Examiner*—James P. Trammell
*Attorney, Agent, or Firm*—Fish & Richardson P.C.

[57] ABSTRACT

An apparatus for generating analog signals, comprising at least one monolithic direct digital synthesis (MDDS) circuit producing an analog MDDS output signal and having at least one digital MDDS input for specifying a desired signal characteristic of the MDDS output signal; one clock generating one clock signal coupled to all the MDDS circuits; and a microprocessor executing a computer program that communicates the desired signal characteristics to the MDDS inputs. The MDDS devices operate at a high clock frequency but generate signals with a low frequency, e.g., 60 Hz. The system monitors its outputs and can maintain its output levels under different conditions. Since all of the signals have a common phase reference the relative phase between the different signals can be programmed.

12 Claims, 8 Drawing Sheets

SIGNAL GENERATING DEVICE USING DIRECT DIGITAL SYNTHESIS

REFERENCE TO APPENDIX

This application includes an 232-page appendix of computer program source code in which the applicant owns copyright, and component data sheets. The copyright owner has no objection to paper reproduction of the appendix as it appears in this patent document, or in the official files of the U.S. Patent & Trademark Office, but grants no other license and reserves all other rights whatsoever. The entire appendix is hereby incorporated by reference as if fully set forth herein.

BACKGROUND

The invention generally relates to digitally synthesized signal generation with particular application to low frequency power signal generation.

A standard technique for synthesizing a waveform uses a microprocessor or digital signal processor to read a digitized waveform from memory, and then write it to a digital to analog converter (DAC) consecutively at fixed time intervals. This and other similar techniques have several disadvantages, including the use of multiple electronic components for each channel on which a signal is generated. The use of multiple components increases the power consumption, size, complexity, and cost of the system, while decreasing reliability. Moreover, if multiple signals must have a common phase reference, complex multiprocessor synchronization techniques must be used, requiring more circuitry or complicated computer programs. The present invention provides signal generation without these disadvantages.

Recently, companies that control electric power distribution have begun to mandate the monitoring of power line load levels. For example, public utility power companies are beginning to automate power line load monitoring functions traditionally performed manually. However, until this invention, utilities and other institutions have had no way to test completely these monitoring devices. The present invention directly addresses this need by offering the capability of synthesizing power line loading signals for testing and other purposes.

SUMMARY OF THE INVENTION

In general, in one aspect, the invention features an apparatus for simultaneously generating more than one analog signal, comprising more than one direct digital synthesis (DDS) circuit, each producing an analog DDS output signal and each having at least one digital DDS input for specifying a desired signal characteristic of the DDS output signal; one clock generating one clock signal coupled to all the DDS circuits; and a microprocessor executing a computer program that communicates the desired signal characteristics to the DDS inputs. In another aspect, the invention features a signal generator having one direct digital synthesis (DDS) circuit having an analog DDS output signal and at least one digital input for specifying a characteristic of the DDS output signal; an interface coupled to the digital input; an embedded program processor, coupled to a manual input device for specifying at least one characteristic of the DDS output signal, and coupled to a digital display; and a computer program in the embedded program processor for controlling the interface in response to characteristics received from the input device. In another aspect, the invention provides methods for signal generation using DDS circuits to produce a low-frequency analog output signal under program control, synchronized and phase-locked using a single clock. Implementations of the invention use DDS devices at a clock frequency of greater than 10 MHz to generate output signals at frequencies of less than 100 Hz, such as power line test signals at 50 Hz or 60 Hz.

BRIEF DESCRIPTION

DESCRIPTION

Figure 1:
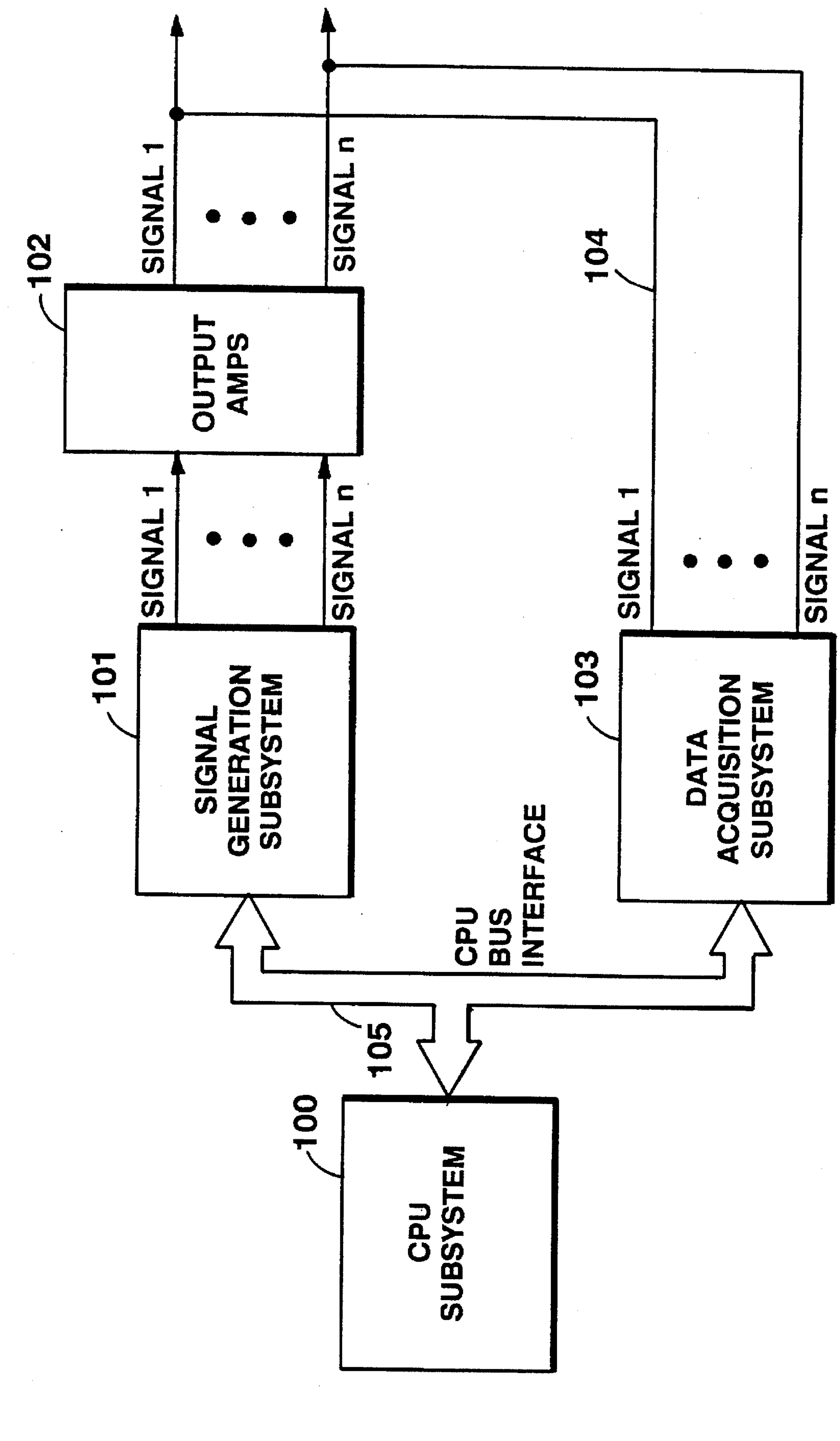
FIG. 1 is a high-level block diagram showing main components of a multi-channel signal generation system.

Analog low-frequency signal generation is accomplished using monolithic direct digital synthesis (MDDS) circuits. As described in detail below, such signal generation can include a system which monitors the signals and determines if they are within an allowable error limit. If they exceed the error limit a corrective action is taken to reduce the error. The phase, frequency, and amplitude of any of the signals can be changed in real time under program control. The invention provides a flexible and cost effective signal generator, using hierarchical design that maximizes efficiency by spreading complexity evenly over several subsystems.

A signal generator of this type can be constructed in three major subsystems. The first is the CPU subsystem. It interprets signal generation commands, scripts or programs and transfers commands to the one or more of the signal generation channels. The CPU subsystem also monitors the magnitude of the signal outputs, detects errors, and sends correcting commands to the second subsystem, the signal generation subsystem. Moderate to slow CPU clock speed is generally adequate to successfully accomplish error correction.

The signal generation subsystem is formed around one or more MDDS devices. These devices are designed to support communication systems, such as cellular radiotelephone systems, and have phase, frequency and amplitude modulation control inputs. In this invention, the modulation control inputs are not used to encode signals, as is customary; rather, the modulation control inputs are used to control the phase, frequency and amplitude characteristics of the MDDS signal outputs.

Also, in this invention, multiple MDDS devices are synchronized to a common clock, which gives the MDDS devices a common phase reference. The common clock signal distributed to the devices is reconstructed using a Phase Locked Loop (PLL). When the devices are enabled with a single enable line, they maintain a constant phase relationship because their clock signals are phase locked together.

Since the MDDS devices completely synthesize the output signal on the MDDS chip, they impose no processing load on the CPU system.

The third subsystem, the data acquisition subsystem, uses an analog to digital converter to monitor both the RMS and instantaneous values of the output signals. The RMS value is used to determine the amplitudes of the signals and the instantaneous values are used to determine each signal's phase and frequency.

Signal generation in this manner will generate accurate signals that maintain a known, constant phase relationship to one another and that are programmable in real time.

One feature of the invention is the use of MDDS devices, which are monolithic integrated circuits not intended for the low-frequency use described herein. Rather, MDDS devices are intended for use in high frequency communication devices. These integrated circuits are small and have low power consumption compared to traditional circuits that perform a similar function. MDDS devices are also much less expensive than traditional circuits performing a similar function.

Another feature of the invention is the use of a common phase reference to multiple signal sources, which allows the phase of one signal to be set relative to that of another.

Yet another feature of the invention is digital self-calibration, which allows for the correction of errors in the signal by reading actual signal characteristics and comparing them with the desired characteristics.

Still another feature of the invention is the programming interface, which allows the phase, frequency, and amplitude of each signal to be modified in real time, as they are generated, according to a predetermined set of consecutive states called a script.

Other features of the invention will be apparent from this description.

MULTI-CHANNEL SIGNAL GENERATING

As shown in FIG. 1, a CPU subsystem 100 writes high level signal descriptions including phase, frequency, and amplitude parameters for the different signal channels to the signal generation subsystem 101. To facilitate high speed transfers, the signal generation subsystem is interfaced to the CPU using the CPU system bus 105, by standard address decoding and bus buffering techniques. Alternatively, a high speed serial interface could be used.

The outputs of the signal generation subsystem are connected to an output amplification stage 102 which can be of conventional design with different voltage and driving characteristics. The output signals from the output amplification stage 102 are monitored by the data acquisition subsystem 103. The CPU system 100 reads the signals characteristics from the data acquisition subsystem using the CPU system bus 105. This facilities high speed data transfers.

CPU SUBSYSTEM

Figure 2:
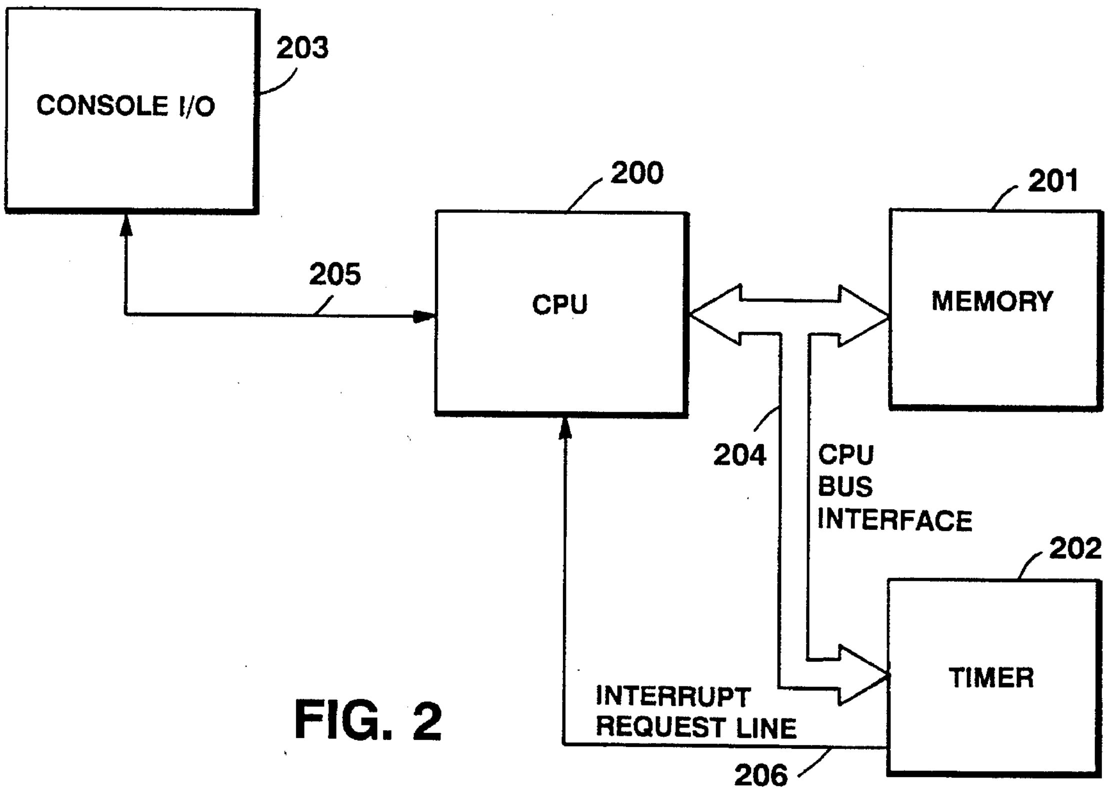
FIG. 2 is a block diagram of components of the CPU subsystem shown in FIG. 1.

Referring now to FIG. 2, CPU 200 executes instructions contained in a memory 201. The CPU 200 is interfaced to the memory 201 using the CPU system bus 204. This is a standard method of interfacing peripherals to a microprocessor.

The CPU 200 is also interfaced to a high speed timer 202, which is used to notify the CPU 200 to update the signal characteristics. The high speed timer 202 uses an interrupt line 206 to notify the CPU 200 that the update time interval has passed.

The CPU 200 is controlled through a console 203. The console 203 can be an independent computer system, or it can be a "dumb terminal" having only a keyboard and monitor if the CPU subsystem is a complete computer subsystem. The computational requirements of the CPU subsystem 100 vary with the update rate required by the user. The update rate can be defined as how often the signal characteristics (phase, amplitude, and frequency) must be changed. For example, for applications requiring update rates of less than 1 KHz, a desktop computer based on an Intel 80386DX-33 microprocessor will suffice as the basis for CPU subsystem 100. For applications requiring higher update rates, a microcontroller with a high speed timing subsystem or a digital signal processor can be used.

Figure 3:
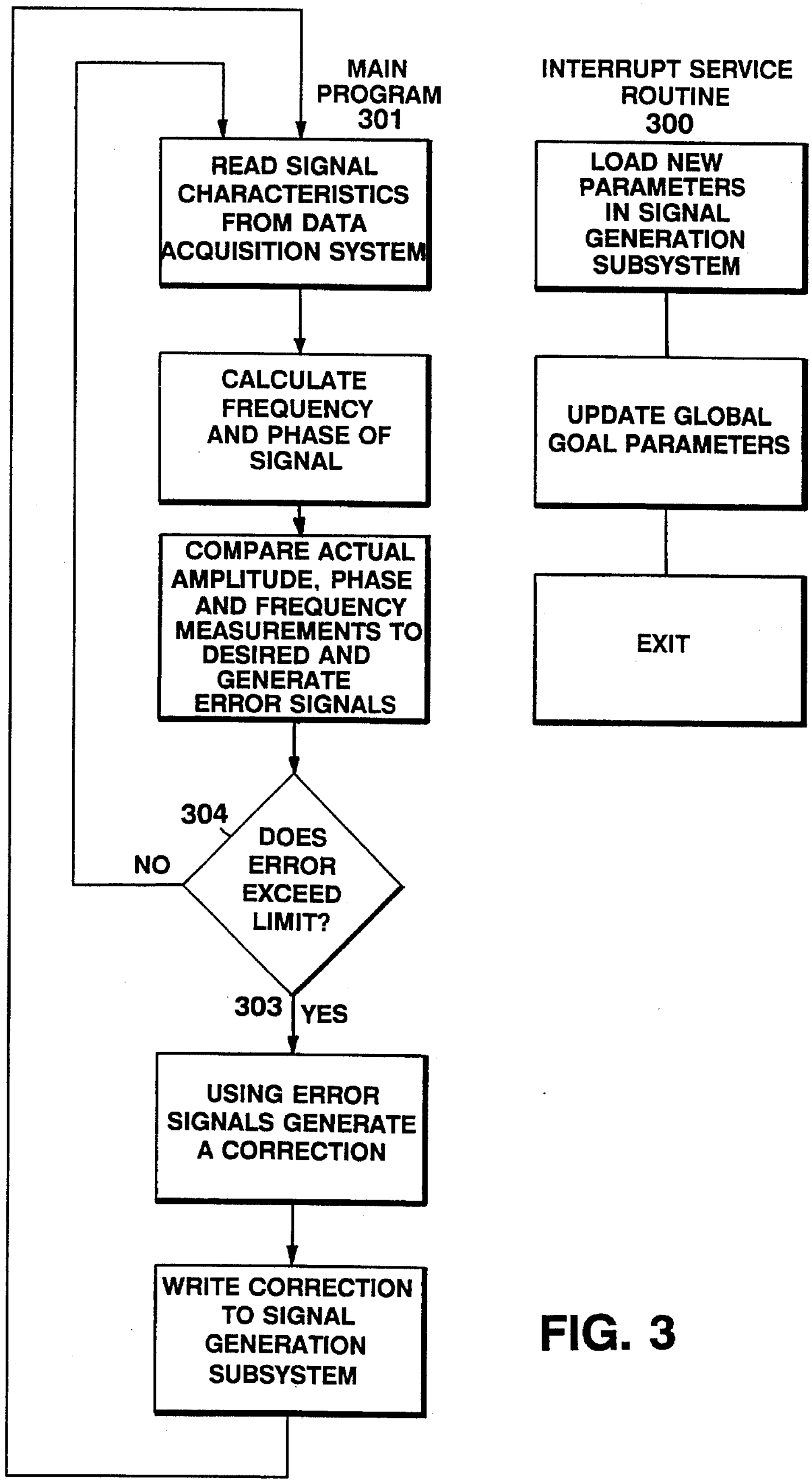
FIG. 3 is a flow diagram of a portion of a computer program run by the CPU of FIG. 1 and FIG. 2.

FIG. 3 is a flow diagram of a portion of the computer program used to operate the circuit shown in FIG. 1 and FIG. 2. An interrupt service routine 300 is called when the timer asserts the interrupt line. This happens at fixed intervals selected for the frequency at which the signal parameters are to be updated. The interrupt service routine 300 reads the new signal parameters from memory and writes them to the signal generation subsystem 101. It also updates variables in the CPU memory, including variables that hold the "desired" or "goal" state of each of the signals, corresponding to the recently commanded state.

The main program 301 also reads the characteristics of the signals actually generated by the system from the data acquisition subsystem 103 and compares the actual signal characteristics with the desired signal characteristics. Depending on the difference between the desired and actual parameters, an error signal is generated.

If the error does not exceed a pre-determined limit, as shown in path 304, then the program jumps back to the beginning of the loop and begins the comparison process over again. If the error exceeds a pre-determined limit, as shown by path 303, then the analog error is translated to a digital correction signal, and written to the signal generation subsystem 101. The program then jumps to the beginning of the loop and begins the comparison process again.

In this manner, extremely fast update rates can be achieved, because this program requires very little action by the microprocessor to modify the signal parameters. Such low processor overhead is highly advantageous.

In the appendix to this specification is a source code listing of an exemplary computer program to implement this program and many other features that are more fully described in the source code itself and its embedded comments.

SIGNAL GENERATION SUBSYSTEM

Figure 4:
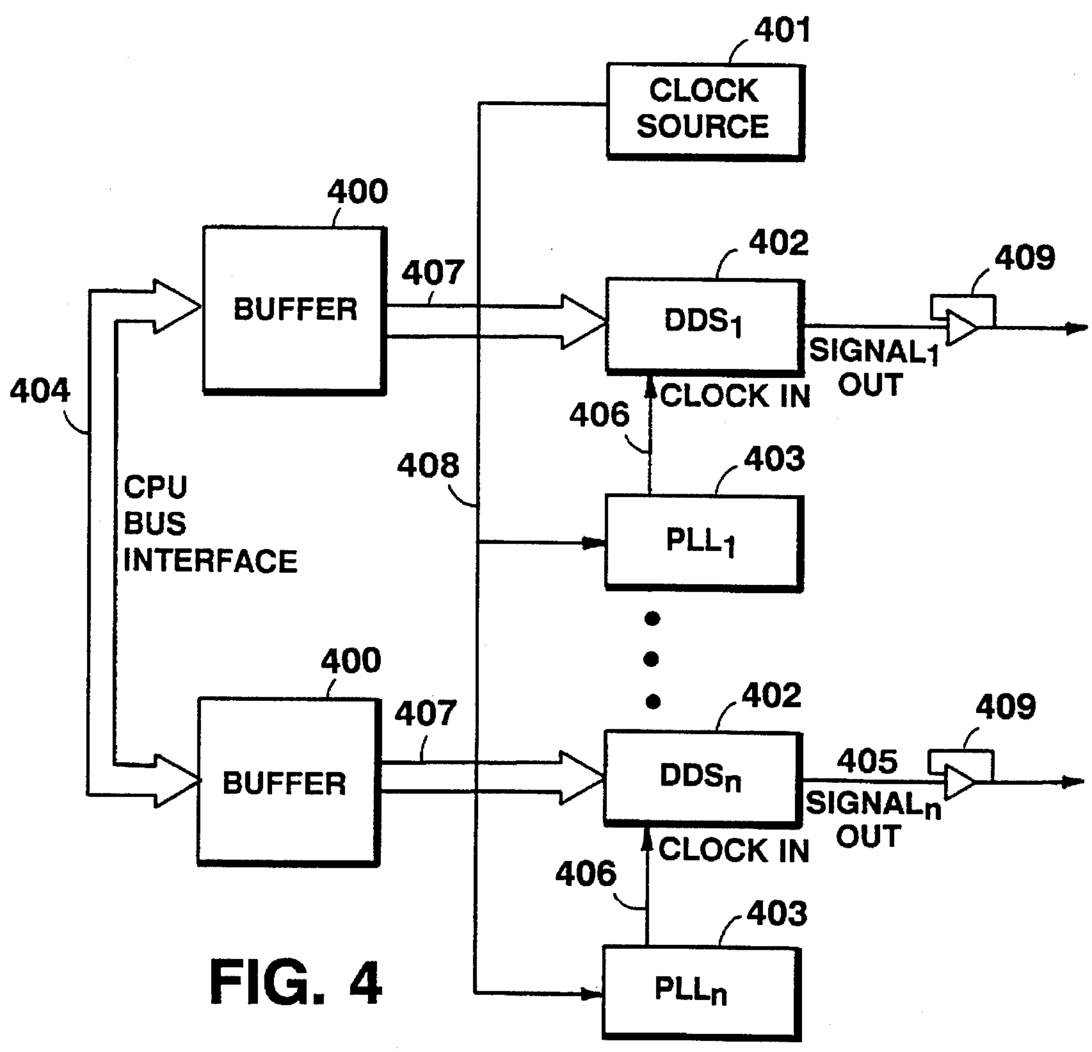
FIG. 4 is a schematic diagram of components of the signal generation subsystem of FIG. 1.

In FIG. 4, a signal generation subsystem has buffers 400 that are used as an interface between the CPU system 100 and the MDDS devices 402. The buffers 400 latch the control signals 407 from the CPU bus interface 404, thus preserving the state of the command. They also protect the MDDS devices from noise effects caused by the presence of high speed digital signals on the input pins of the MDDS devices while they are not selected.

A single clock source 401 for the circuit is provided. The clock source can be a standard crystal oscillator with a TTL output. The clock source frequency must not exceed the capacity of the MDDS devices 402 or the bandwidth of the PLL circuits 403. As described below, one suitable MDDS device is the AD7008 CMOS DDS Modulator available from by Analog Devices, One Technology Way, P.O. Box 9106, Norwood, Mass. 02062-9106. The AD7008 can use a clock frequency of 20 MHz to 50 MHz. Using a 50 MHz clock permits the output signal to be adjusted at the finest resolution.

The clock signal 408 is distributed to several PLL circuits 403. A separate PLL circuit is provided for each signal channel. The PLL circuits 403 each reconstruct the clock signal 408 by removing any deleterious noise signals or jitter that may have contaminated the clock signal 408 during its distribution from the clock source. The output of the PLL circuit is the 'CLOCK IN' signal 406, which is cleaned up and locked in phase with the clock source signal 408.

The output signal 405 of the MDDS devices is optionally buffered using a standard voltage follower circuit 409. The voltage follower circuit is formed around an op-amp such as model AD711, available from Analog Devices. The voltage follower circuit makes the output of the signal generation system 101 low impedance.

Figure 5:
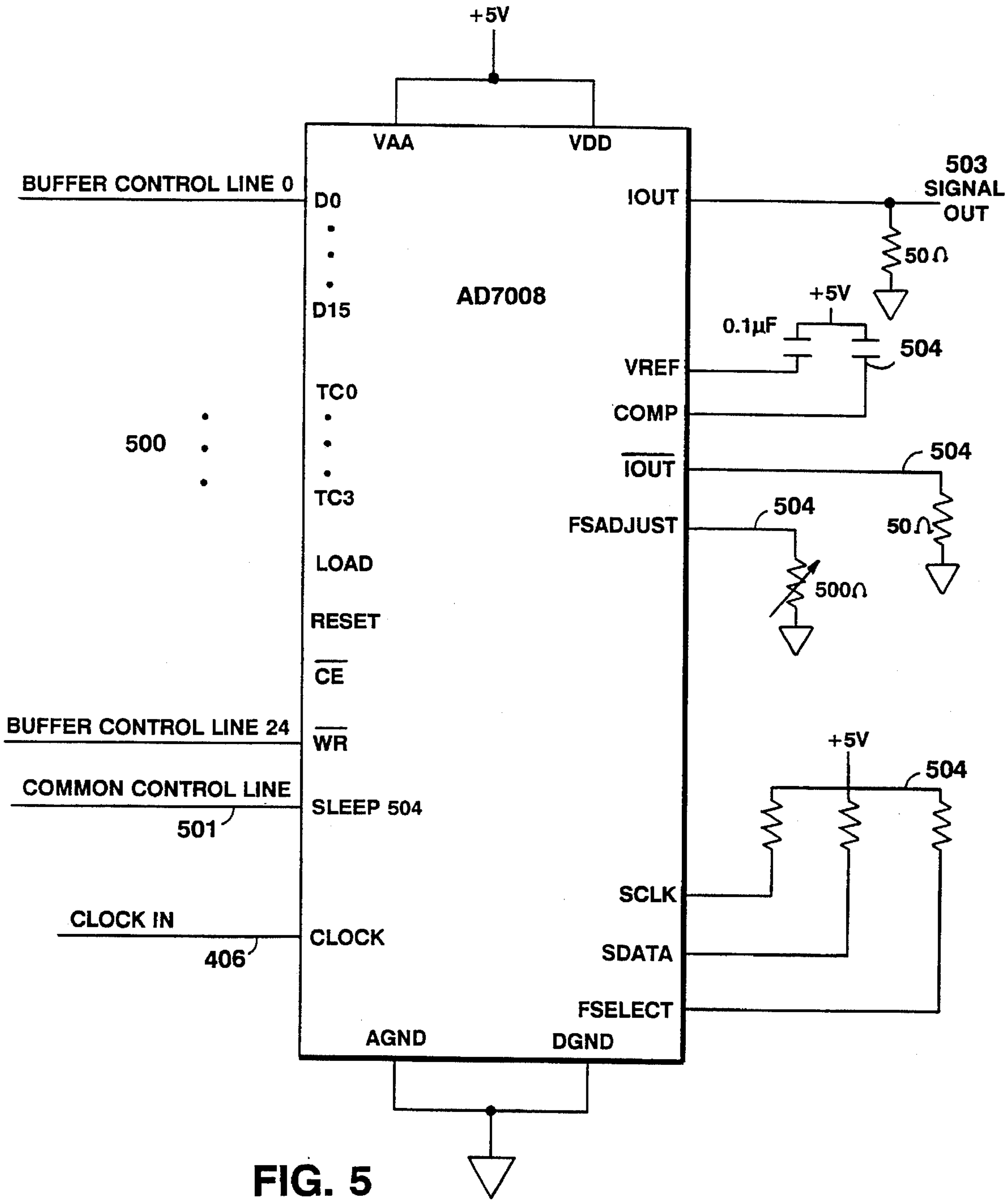
FIG. 5 is a schematic diagram of a digital signal synthesis device.

FIG. 5 shows one standard MDDS device, the Analog Devices AD7008, is connected to the other components in the signal generation subsystem. Other similar devices could be used in place of the AD7008. Twenty-five buffered control lines 500 send the control signals and data from the CPU to the MDDS device. In a multi-channel signal generation system, a common buffered control line 501 is connected to all of the SLEEP pins on each MDDS device in the system. The common sleep control line is used to bring all the MDDS devices out of sleep mode simultaneously.

The 'CLOCK IN' signal 406 is the output signal of the PLL circuit 403. The output signal of AD7008 comes from the IOUT pin. The remaining connections 504 are standard, and can be connected as shown in the AD7008 data sheet, available from Analog Devices, which is incorporated herein by reference.

Figure 6:
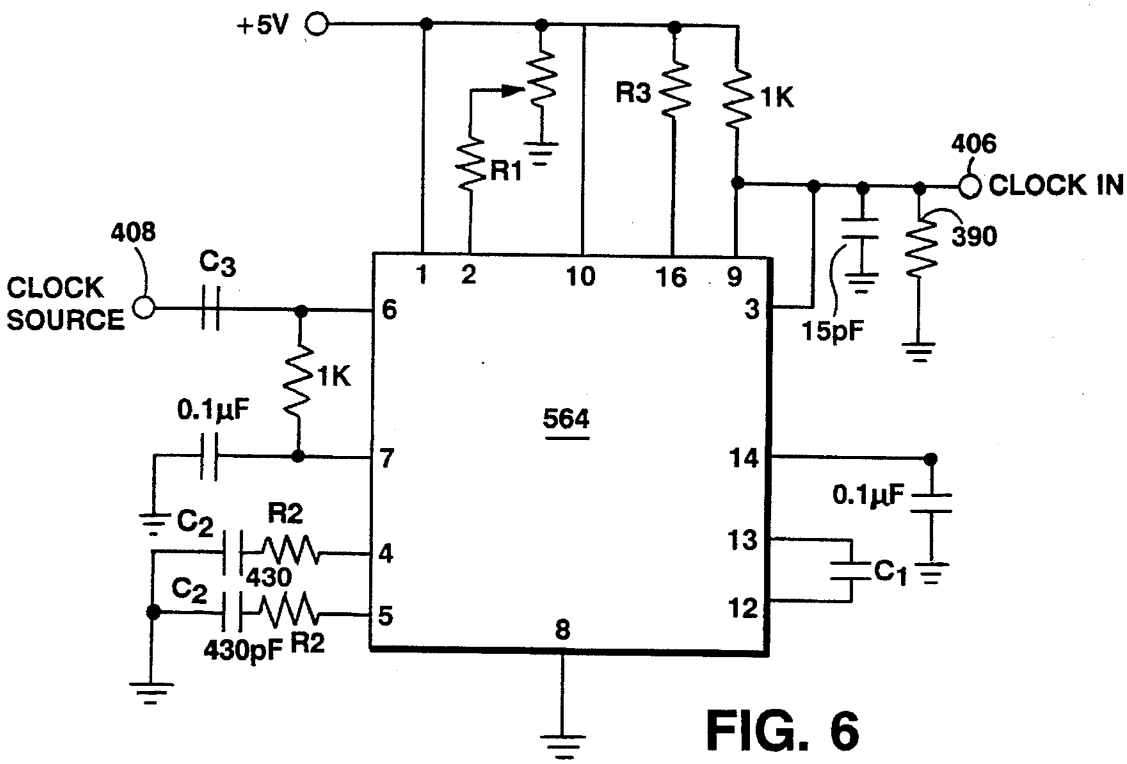
FIG. 6 is a schematic diagram of a phase locked loop clock recovery circuit.

FIG. 6 shows a phase locked loop (PLL) circuit used in the signal generation subsystem. Each PLL circuit is formed around a PLL IC such as the SE/NE564, available from Signetics Company, 811 E. Arques Avenue, P.O. Box 3409, Sunnyvale, Calif. 94088-3409. Any similar device with sufficient bandwidth could be used. The clock source 408 comes in to pin 6 through a high pass filter. The reconstructed clock signal, CLOCK IN 406, is output at the connection between pins 9 and 3. The voltage controlled oscillator (VCO) in the PLL IC locks on to the mean frequency of the clock source signal and outputs a clean phase locked signal. The values of the passive components are sized to the bandwidth of the clock source and can be determined from the PLL IC data sheet, such as the NE564 data sheet available from Signetics, which is incorporated herein by reference.

A signal generator circuit of this type enables MDDS devices to generate analog signals at low frequencies. Low-frequency signal generation is not the intended use of MDDS devices, but a signal generation system of the type described here can generate analog signals below 100 Hz, e.g., 50 Hz or 60 Hz for testing power line monitoring devices.

DATA ACQUISITION SUBSYSTEM

Figure 7:
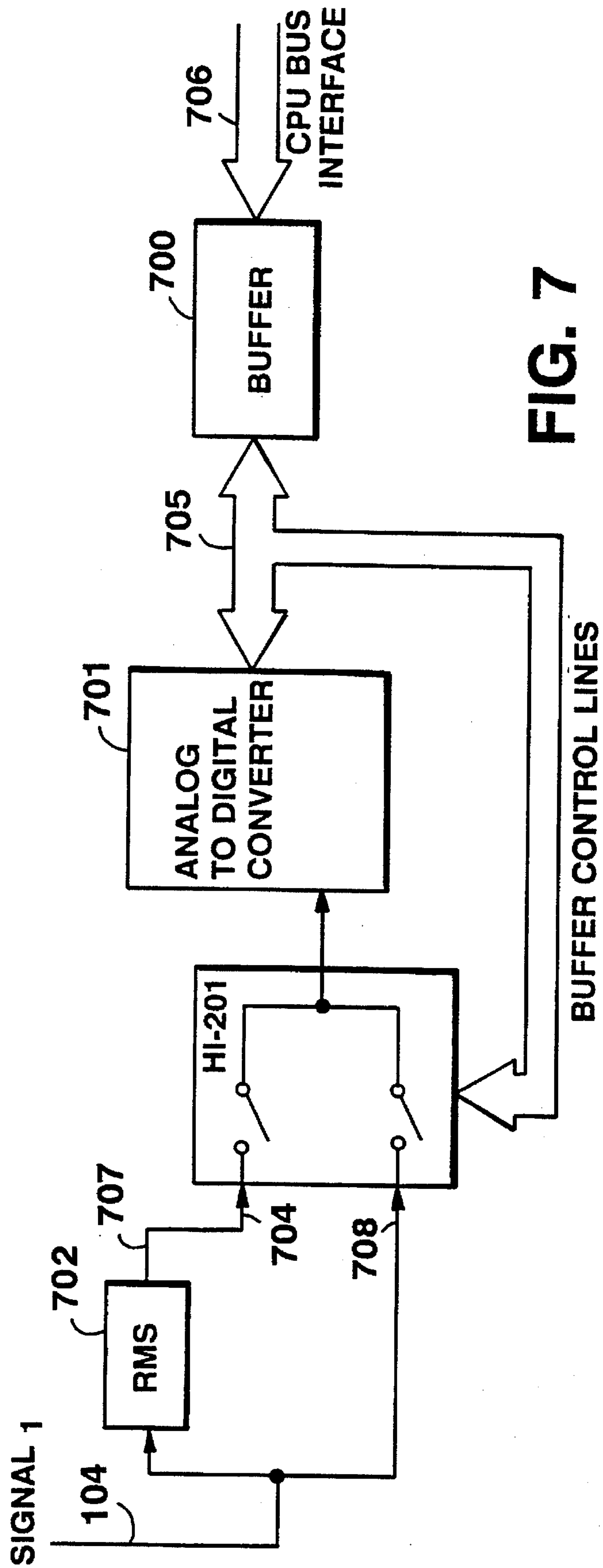
FIG. 7 is a block diagram of components of the data acquisition subsystem shown in FIG. 1.

FIG. 7 shows the signal acquisition subsystem components of a data acquisition subsystem 103. One signal subsystem is used for each signal generation channel. Each signal channel has a buffer 700 to interface the CPU system 100 and analog to digital converters (ADCs) 701. Alternatively, the signals from all of the channels could be multiplexed and connected to a single analog to digital converter. The buffers 700 latch the control signals 705 from the CPU bus interface 706, thus preserving the state of each CPU command. The buffers also protect the ADC 701 from noise effects caused by the presence of high speed digital signals on their input pins while they are not selected. The ADC's 701 are of standard type with the required resolution dependent on the user's specifications. One exemplary ADC is the Analog Devices AD1674, which is a 12-bit sampling ADC, available from Analog Devices, described in the data sheet which is incorporated herein by reference.

Signals 104 come from the output amplifiers 102. The signals 104 are split into two paths. One path goes to an RMS conversion circuit 702. The RMS conversion circuit can be one of several circuits that are commercially available, such as the Analog Devices AD636, available from Analog Devices, described in the data sheet which is incorporated herein by reference. The output of the RMS conversion circuit 707 is fed to one switch of an dual analog switch 704. The other path of the feedback signal 104 goes directly to the second analog switch 708. Any standard low-on-resistance analog switch will work. An exemplary switch is the HI-201, which is made by several manufacturers, such as the Analog Devices ADG201A, available from Analog Devices, the data sheet for which is incorporated herein by reference.

With this arrangement, the signal source going to the ADC 701 can be switched between the instantaneous value of the feedback signal 104 or the RMS value of the feedback signal 707. The state of the analog switch is controlled by a set of buffered control lines. When the RMS signal is connected to the ADC, the amplitude of the signal can be measured quite efficiently. When the instantaneous signal is connected to the ADC, the frequency and phase can be measured.

The multi-channel signal generator system described above is used in a SCADA Device Tester (SDT), which is a programmable device used to test and exercise different SCADA controllers of the type used by power distribution institutions, such as public power companies. One type of SCADA controller is the RTU. The SDT provides all of the standard sensor outputs, control inputs, and status outputs required to interface to an RTU. The SDT can be controlled manually or scripts can be written which control all outputs with 1 cycle response time.

SDT Outputs

Line Sensor Signals: The SDT generates signals that emulate line sensor signals from both current output and voltage output sensors. This allows the SDT to emulate a wide variety of SCADA devices. The phase and amplitude of these sensors can be set in real time to simulate all line conditions. These line signals are all programmable. The SDT has 6 voltage sensor outputs, having an amplitude range of 0-17.5VAC RMS @500MA, with 0.1% accuracy, 0.1 degree phase resolution, and 0.01 HZ frequency resolution. It also has 6 current sensor outputs, having an amplitude range of 0–7.5Amps RMS with 0.1% accuracy, 0.1 degree phase resolution, and 0.01 HZ frequency resolution.

Power Fail Signal: The SDT generates a programmable single phase line power output which has an output range of 0–120VAC @2.5 A RMS. This output can be used to test a device's response to power droops and failures.

DC Voltage Output: A programmable DC output voltage is provided its range is 0–25 VDC @500MA, with 0.1% Accuracy.

Status Outputs: 16 Programmable Switch closures are provided. These can be used in a normally open or normally closed configuration SDT Inputs: The SDT has eight independent control inputs. The timing of any transition on these inputs can be detected within 100 microseconds. These input transitions are logged relative to a cycle number during the execution of a user program or script.

Operation: To operate the SDT one connects the terminal outputs of the SDT to the proper inputs of the device to be tested. Turning the SDT causes it to boot up and execute its control program.

Interface: The SDT is programmed and controlled using its control program. A simple terminal is used to interface to the SDT's control program. The control program is menu driven. From the control program the user can set the signal outputs manually from the channel control menu. To set a channel's signal parameters the user selects the channel to which the commands are to be directed, selects which parameter is to be modified, Phase, Amplitude, or Frequency, and enters the data. When the signal parameters must be changed at a fast rate it is best to operate the SDT under the control of a "script". A script is a series of manual commands with the added piece of information that tells in which cycle (in terms of 60 HZ cycles) the "signal event" is to happen. A script is written in a standard text editor. It is loaded into the control program with the "read script" command and executed using the "execute script" command. An example script is set forth later in this specification.

SIGNAL SCRIPTS

The CPU 200 can receive input under program control from a script containing a list of desired signal characteristics or parameters to be set and changed over time. An exemplary script is given below, which can be used to generate a set of signals to test a SCADA power line monitoring device of the type used by power companies (such as Pacific Gas & Electric Co., San Francisco, Calif.). The exemplary script follows a format described below.

There are two types of lines in a script: configuration and command lines.

CONFIGURATION LINES: Configuration lines always contain a '#' symbol at the beginning of the line. The '#' is followed by a keyword that describes what is being configured. The keyword is always followed by a colon ':'). Valid keywords are repeat, amplitude, phase, current, and voltage. The following description gives each keyword, its function and syntax, and an example of its use.

```
repeat:n
        script is executed n times; default is one.
        example for repeat:
#repeat:10 /* repeats the script 10 times */

amplitude:peak or rms
        controls whether amplitude inputs will be treated as
rms or peak, default is rms.
        example for amplitude:
#amplitude: rms /* amplitude commands are rms */

phase:relative or absolute
        controls whether phase inputs will be treated as
absolute or relative, default is absolute */
        example for phase:
#phase: absolute /* phase inputs are in absolute */

current:amps or volts
        control where all current signals will be
directed, to the voltage outputs or current
outputs, default is volts.
        example for current:
#current: volts /* current signals will be output as
voltage */
```

COMMAND LINES: Each command line defines an event or an action taken by the SDT. A command line always has 4 components. These components are defined on the command line left to right, beginning with component 1:

Component1 Component2 Component3 Component4
Delimiters separating the components can be spaces, tabs, commas, or semicolons. The four components are defined as follows:

Component 1—The cycle number 60 HZ at which the event is to occur. Cycle zero 0 is defined as the first cycle.

Component 2—The channel to which the event will be directed. These are 10 different channels:

1) AV—Phase A Voltage Channel
2) AC—Phase A Current Channel
3) BV—Phase B Voltage Channel
4) BC—Phase B Current Channel
5) CV—Phase C Voltage Channel
6) CC—Phase C Current Channel
7) DV—Phase D Voltage Channel
8) DC—Phase D Current Channel
9) ST—Status Tester
10) DA—DC Voltage Signal
11) GN—Full Scale Voltage Setting
12) RS—Analog Signal Reset
13) SV—Variable AC Voltage Component 3—This component has different meanings which depend on the channel to which they are being directed. For Channels 1–8 this component defines the type of event:

PH—Phase

FR—Frequency

AM—Amplitude

For Channel 9 this component defines which status tester is to be affected 0–15. For Channels 10 and 13 this component is not used and should be set to 0. For Channel 11 this component defines the type of event:

VG—Full Scale Voltage for the Voltage Signals

CG—Full Scale Voltage for the Current Signals

For Channel 12 this component is not used and should be set to 0. Component 4—This Component defines the data* used in the event. For Channel 12 this value should be set to zero (0). For Channel 13 this value is in percent of full scale 132 V)

The example script follows:

SAMPLE SCRIPT

| | | | | |
|---|---|---|---|---|
| # current: volts | | | | /* set the current sensor outputs to voltage */ |
| # repeat: 10 | | | | /* repeat the script 10 times */ |
| # amplitude: rms | | | | /* the amplitude commands will be rms */ |
| 1 | GN | VG | 5 | /* VOLT. SIG. TO A FULL SCALE OF 5 VOLTS */ |
| 1 | GN | CG | 15 | /* CUR. SIG. TO A FULL SCALE OF 20 VOLTS */ |
| 1 | AV | PH | 0.0 | /*SET 3 PHASE REL. 120 DEGREE APART */ |
| 1 | AC | PH | 0.0 | |
| 1 | BV | PH | 120 | |
| 1 | BC | PH | 120 | |
| 1 | CV | PH | 240 | |
| 1 | CC | PH | 240 | |
| 1 | AV | AM | 1.247 | /*NORMALIZE VOLTAGE & CURRENT*/ |
| 1 | AC | AM | 2 | |
| 1 | BV | AM | 1.247 | |
| 1 | BC | AM | 2.5 | |
| 1 | CV | AM | 1.247 | |
| 1 | CC | AM | 3 | |
| 600 | BC | AM | 13 | /*FAULT AT PHASE B AFTER 10 SECONDS FOR 60 CYCLES*/ |
| 660 | BC | AM | 2 | |

-continued

SAMPLE SCRIPT

| | | | | |
|---|---|---|---|---|
| 660 | AV | AM | 0.0 | /*SIMULATE PROTECTIVE DEVICE TRIP*/ |
| 660 | AC | AM | 0.0 | |
| 660 | BV | AM | 0.0 | |
| 660 | BC | AM | 0.0 | |
| 660 | CV | AM | 0.0 | |
| 660 | CC | AM | 0.0 | |
| 1200 | AV | PH | 0.0 | /*SET 3 PHASE RELATIONSHIP 120 DEGREE APART*/ |
| 1200 | AC | PH | 0.0 | |
| 1200 | BV | PH | 120 | |
| 1200 | BC | PH | 120 | |
| 1200 | CV | PH | 240 | |
| 1200 | CC | PH | 240 | |
| 1200 | AV | AM | 1.247 | /*NORMALIZE VOLTAGE & CURRENT*/ |
| 1200 | AC | AM | 2 | |
| 1200 | BV | AM | 1.247 | |
| 1200 | BC | AM | 2.5 | |
| 1200 | CV | AM | 1.247 | |
| 1200 | CC | AM | 3 | |
| 1201 | RS | 0 | 0 | /* RESET THE ANALOG SIGNALS */ |

SINGLE-CHANNEL SIGNAL GENERATING

Figure 8:
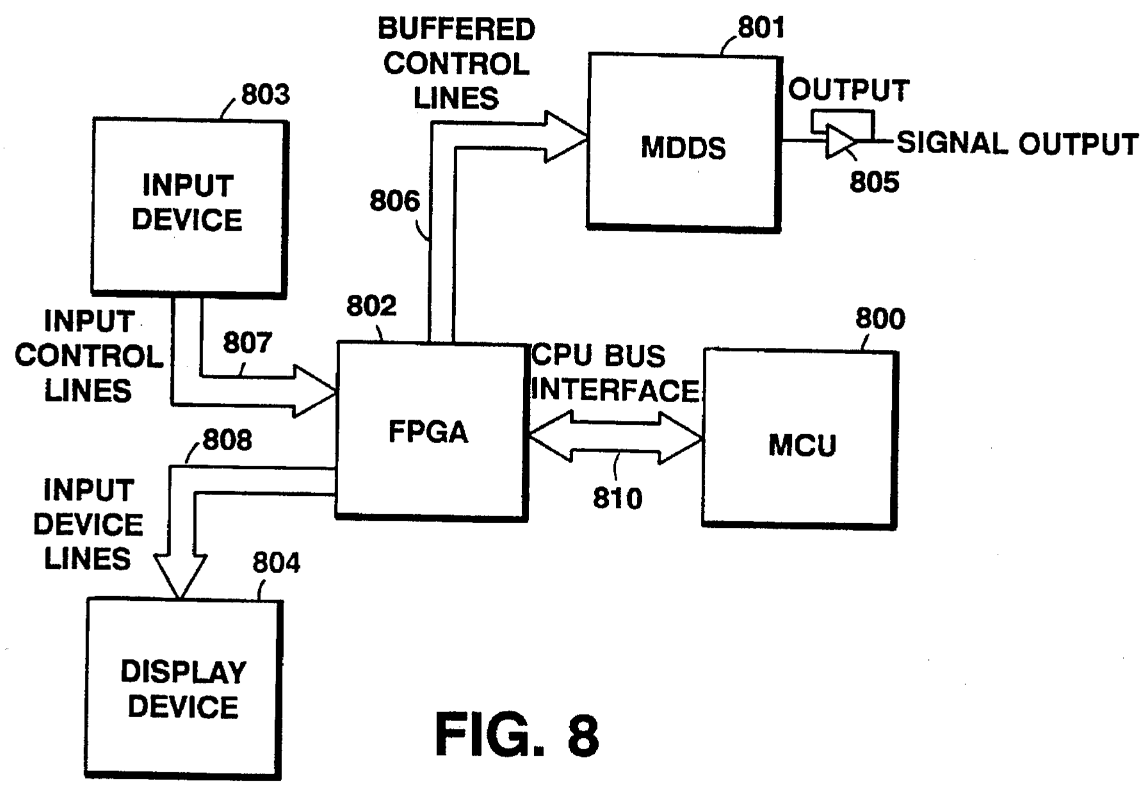
FIG. 8 is a block diagram of a single channel signal generation system.

FIG. 8 shows a single-channel signal generation unit as embodied for a low-cost, laboratory test signal generator. Microcontroller 800 monitors input commands from the input device 803, interprets these commands, updates the display device 804 and sends interpreted signal parameters to the MDDS device 801. The MDDS device then modifies its signal output accordingly.

The Field Programmable Gate Array FPGA 802 acts an I/O device and control line buffer latch. To take advantage of the precise digital nature of this device, the input device 803 is a series of common momentary-on switches which allow the user to change entry modes and to enter exact signal parameters.

The display device 804 is a Liquid Crystal Display (LCD) or similar device. A typical display device that could be used is the AND 721, a 4 row×20 column LCD. The microcontroller 800 can be a Motorola 68HC11 or an 8051 which is made by Intel Corporation and other manufacturers. The FPGA 802 is of common type with at least 50 I/O pins, such as the Altera EPM7064. The MDDS device can be an Analog Devices AD7008.

FIG. 5 shows how this device is connected in this circuit. The clock in signal 406 referenced in FIG. 5 is supplied by a standard TTL 50 MHZ crystal oscillator; as a PLL circuit is not required for a-single channel device. This design has 32 bit frequency resolution over the range of 0–20 MHz, 10 bit amplitude resolution and 12 bit phase resolution.

In the foregoing description, reference numerals 105, 204, 404, 706, and 810 are the same bus of the CPU.

The foregoing description gives illustrative embodiments of the invention. These embodiments are merely exemplary and should not be understood to limit the scope of the invention. The complete scope of the invention is given in the appended claims.

MAIL ROOM
10 OCT 17 1994
PAT. & TRADEMARK OFF.

ATTORNEY DOCKET NO: 06787/002001

APPENDIX TO APPLICATION

[redacted]

TITLE: SIGNAL GENERATING

APPLICANT: JAMES C. SLATER

"Express Mail" mailing label number TB174675554

Date of Deposit 10/17/94

I hereby certify under 37 CFR 1.10 that this correspondence is being deposited with the United States Postal Service as "Express Mail Post Office to Addressee" with sufficient postage on the date indicated above and is addressed to the Commissioner of Patents and Trademarks, Washington, D.C 20231.

Christopher J. Palermo

CHRISTOPHER J. PALERMO

[redacted] anacomm.c ok to print 8/14/96

```
#include <stdio.h>
#include <bios.h>
#include <string.h>
#include <conio.h>
#include <dos.h>
#include <math.h>
#include <float.h>
#include "anacomm.h"

/* defines for transfer control pins TC3,TC2,TC1,TC0 */
#define PHASE   0xa
#define IQAMP   0xb
#define FREQ0   0x8
#define FREQ1   0x9
#define CONTROL 0x0


/* defines for external control lines */
#define  BUS8       0x0
#define  BUS16      0x1

#define  NORMAL     0x0
#define  SLEEP      0x2

#define  AMPMOD     0x4
#define  NOAMPMOD   0x0

#define  CLKSYNCH   0x0
#define  NOCLKSYNCH 0x8



/* address pointers for dds chips */
unsigned char far *accs;
unsigned char far *avcs;
unsigned char far *bccs;
unsigned char far *bvcs;
unsigned char far *cccs;
unsigned char far *cvcs;
unsigned char far *dccs;
unsigned char far *dvcs;

/* address pointers for control registers */
unsigned char far *acr;
unsigned char far *avr;
```

A000001 anacomm.c

```
unsigned char far *bcr;
unsigned char far *bvr;
unsigned char far *ccr;
unsigned char far *cvr;
unsigned char far *dcr;
unsigned char far *dvr;

/* main oscillator frequency */
double clockfreq;
double phaseoffset;
double freq0;
double freq1;
double iamp;
double qamp;

static double AVP,AVF,AVA,AVC;
static double BVP,BVF,BVA,BVC;
static double CVP,CVF,CVA,CVC;
static int DVP,DVF,DVA,DVC;

static double ACP,ACF,ACA,ACC;
static double BCP,BCF,BCA,BCC;
static double CCP,CCF,CCA,CCC;
static int DCP,DCF,DCA,DCC;


/*
 *  Init will assign the addresses to the address pointers,
 *  reset the dds chips, and set the control lines to 0
 */
init(unsigned int base)
{
  accs = (unsigned char far *) MK_FP(base,ACCS_OFFSET);
  avcs = (unsigned char far *) MK_FP(base,AVCS_OFFSET);
  bccs = (unsigned char far *) MK_FP(base,BCCS_OFFSET);
  bvcs = (unsigned char far *) MK_FP(base,BVCS_OFFSET);
  cccs = (unsigned char far *) MK_FP(base,CCCS_OFFSET);
  cvcs = (unsigned char far *) MK_FP(base,CVCS_OFFSET);
  dccs = (unsigned char far *) MK_FP(base,DCCS_OFFSET);
  dvcs = (unsigned char far *) MK_FP(base,DVCS_OFFSET);

  acr = (unsigned char far *) MK_FP(base,ACR_OFFSET);
  avr = (unsigned char far *) MK_FP(base,AVR_OFFSET);
  bcr = (unsigned char far *) MK_FP(base,BCR_OFFSET);
  bvr = (unsigned char far *) MK_FP(base,BVR_OFFSET);
  ccr = (unsigned char far *) MK_FP(base,CCR_OFFSET);
```

A000002

[redacted]

anacomm.c

3

```
  cvr = (unsigned char far *) MK_FP(base,CVR_OFFSET);
  dcr = (unsigned char far *) MK_FP(base,DCR_OFFSET);
  dvr = (unsigned char far *) MK_FP(base,DVR_OFFSET);

  *acr = 0;
  *avr = 0;
  *bcr = 0;
  *bvr = 0;
  *ccr = 0;
  *cvr = 0;
  *dcr = 0;
  *dvr = 0;

  strobereset(acr);
  strobereset(avr);
  strobereset(bcr);
  strobereset(bvr);
  strobereset(ccr);
  strobereset(cvr);
  strobereset(dcr);
  strobereset(dvr);

  return(0);

}


/*
 * This routine will write the 32 bit number write, one byte at a time msb
 * first to the address specified by ddsport
 */
int writepareg(unsigned long int write,unsigned char far *ddsport)
{
  unsigned char temp;

  temp = (write & 0xff000000L) >> 24;
  *ddsport = temp;
  temp = (write & 0x00ff0000L) >> 16;
  *ddsport = temp;
  temp = (write & 0x0000ff00L) >> 8;
  *ddsport = temp;
  temp = (write & 0x000000ffL);
  *ddsport = temp;
  wait();
  return(0);
```

anacomm.c

```
}

/*
 * select sleep will change the sleep line in the control
 * register
 */
int selectsleep(int sleep, unsigned  char far *creg)
{

  if (sleep)
    *creg |= 0x40;
  else
    *creg &= 0xbf;

  return(0);
}

/*
 * select frequency will change the frequency line in the control
 * register
 */
int selectfreq(int freq, unsigned  char far *creg)
{

  if (freq)
    *creg |= 0x20;
  else
    *creg &= 0xdf;

  return(0);
}

/*
 * strobeload will toggle hi-lo the load line in the control
 * register
 * This is used to strobe either the Write, Reset or Load strobe pins
 */
int strobeload(unsigned  char far *creg)
{
  *creg |= 0x10;
  wait();
  *creg &= 0xef;
  return(0);
}

/*
 * strobereset will toggle hi-lo the reset line in the control
```

A000004

5 anacomm.c

```
 * register
 */
int strobereset(unsigned  char far *creg)
{
  *creg |= 0x80;
  wait();
  *creg &= 0x7f;
  return(0);
}


/*
 *  set_clock_freq will modify clock_freq the global var which holds
 *  the variable from which frequency is calculated.
 */
int set_clock_freq(double frequency)
{
  clockfreq = frequency;
  return(0);
}


/*
 *  get_clock_freq will return the value clock_freq the global var which holds
 *  the variable from which frequency is calculated.
 */
double get_clock_freq(void)
{
  return(clockfreq);
}


/*
 * This sets up the transfer control pins and then strobes the load line.
 * It transfers the contents of the parallel register to the destination
 * register specified by the tcontrol pins
 */
int transfer(unsigned char tcontrol,unsigned char far *creg)
{
  unsigned char temp;

  *creg &= 0xf0;        /* zero out the lower four byte of the control port*/

  temp = tcontrol & 0xf;  /* zero out the upper four bytes of the transfer port*/

  *creg |= temp;         /* load in the transfer control bits */
```

A000005 anacomm.c

```
  wait();


  strobeload(creg);       /* Loads tcontrol into tcontrol register. */
                          /* and loads parallel register into internal
                             register denoted by tcontrol */

  *creg &= 0xf0;          /* zero out the lower four byte of the control port*/

  return(0);
}


/*
 * Simple Delay
 */
int wait()
{
  int a;
  for(a=0;a<200;a++);
  return(0);
}


/*
 * set control will set the internal control register of the dds chip specified
 * by ddsport the associated external control register defined by creg is used
 * to transfer the information to the internal control reg from the parallel
 * assembly register
 */
int setcontrol(int control, unsigned char far *ddsport,unsigned  char far *creg)
{
  assign_channel_control(creg,control);
  writepareg(control,ddsport);
  transfer(CONTROL,creg);
  return(0);
}


/*
 *  setphase will set the internal control phase accummulator register of the dds chip specified
 * by ddsport. The associated external control register defined by creg is used
 * to transfer the information to the phase acc. reg from the parallel
 * assembly register.  phase offset is the phase offset in
 */
int setphase(double phase, unsigned char far *ddsport,unsigned  char far *creg)
{
```

anacomm.c

7

```
  int phase_offset;

  assign_channel_phase(creg,phase);

  phase_offset = (int)(((float)4096/360.00)*phase) % 4096;

  if (phase_offset >= 4096) {
    phase_offset %= 4096;
  }
  if (phase_offset < 0) {
    phase_offset = 4095 - (abs(phase_offset) %4096);
  }
  writepareg(phase_offset,ddsport);
  transfer(PHASE,creg);
  return(0);
}


/*
 *  setamplitude will set the internal amplitude register of the dds chip specified
 * by ddsport. The associated external control register defined by creg is used
 * to transfer the information to the amplitude reg from the parallel
 * assembly register.  iamp is inphase component between +/- 1.0 qamp is quadrature
 * component between +/- 1.0
 */
int setamplitude(double qamp,double iamp, unsigned char far *ddsport,unsigned  char far *creg)
{
  unsigned long int qampword;
  unsigned long int iampword;
  unsigned long int ampword;
  double maxamp;

  assign_channel_amplitude(creg,iamp);


  maxamp = 1.0 - (float)1.0/1023.0;

  if (qamp >= 1) {
    qamp = maxamp;
  }
  if (iamp >= 1) {
    iamp = maxamp;
  }
  if (qamp < -1) {
    qamp = -1;
  }
  if (iamp < -1) {
```

anacomm.c

```
    iamp = -1;
  }

  qampword = (qamp +1) * 512;
  qamp = (float)qampword/512-1;
  qampword ^= 512;

  iampword = (iamp +1) * 512;
  iamp = (float)iampword/512-1;
  iampword ^= 512;

  ampword = 0;
  ampword = (qampword << 10) | iampword;

  writepareg(ampword,ddsport);
  transfer(IQAMP,creg);
  return(0);
}

/*
 * setfreq0 will set the internal frequency 0 register of the dds chip specified
 * by ddsport. The associated external control register defined by creg is used
 * to transfer the information to the frequency 0 reg from the parallel
 * assembly register.  frequency is defined in hertz range is 0 to clkfreq/2
 */
double setfreq0(double frequency,unsigned char far *ddsport,unsigned  char far *creg)
{

  unsigned long int freqword;

  assign_channel_frequency(creg,frequency);

  /*printf("Setting Frequency 0 goal = %f\n",frequency);*/

  freqword = frequency * pow(2,32)/get_clock_freq();

  writepareg(freqword,ddsport);

  transfer(FREQ0,creg);

  /*printf("Frequency set to %f Mhz\n",freqword * get_clock_freq()/pow(2,32));*/

  return(frequency * get_clock_freq()/pow(2,32));

}

/*
```

[redacted]

anacomm.c

9

```
 * setfreq1 will set the internal frequency 1 register of the dds chipspecified
 * by ddsport. The associated external control register defined by creg is used
 * to transfer the information to the frequency 1 reg from the parallel
 * assembly register.  frequency is defined in hertz range is 0 to clkfreq/2
 */
double setfreq1(double frequency,unsigned char far *ddsport,unsigned char far *creg)
{
  unsigned long int freqword;

  printf("Setting Frequency 0\n");

  freqword = frequency * pow(2,32)/get_clock_freq();


  writepareg(freqword,ddsport);

  transfer(FREQ1,creg);

  return(frequency * get_clock_freq()/pow(2,32));

}

/*
 *
 *
 *
 */
int assign_channel_phase(unsigned char far *channel, double data)
{
  switch(get_channel_offset(channel)) {
    case  AVR_OFFSET:
      AVP = data;
      break;
    case  ACR_OFFSET:
      ACP = data;
      break;
    case  BVR_OFFSET:
      BVP = data;
      break;
    case  BCR_OFFSET:
      BCP = data;
      break;
    case  CVR_OFFSET:
      CVP = data;
      break;
    case  CCR_OFFSET:
      CCP = data;
```

A000009 anacomm.c

10

```
      break;
    case  DVR_OFFSET:
      DVP = data;
      break;
    case  DCR_OFFSET:
      DCP = data;
      break;
    default:
      printf(" NO Channel Set!\n");
      break;
  }
  return(0);
}


/*
 *
 *
 *
 */
int assign_channel_amplitude(unsigned char far *channel, double data)
{
  switch(get_channel_offset(channel)) {
    case AVR_OFFSET:
      AVA = data;
      break;
    case  ACR_OFFSET:
      ACA = data;
      break;
    case  BVR_OFFSET:
      BVA = data;
      break;
    case  BCR_OFFSET:
      BCA = data;
      break;
    case  CVR_OFFSET:
      CVA = data;
      break;
    case  CCR_OFFSET:
      CCA = data;
      break;
    case  DVR_OFFSET:
      DVA = data;
      break;
    case  DCR_OFFSET:
      DCA = data;
      break;
```

A000010 anacomm.c

```
    default:
      printf(" NO Channel Set!\n");
      break;
  }
  return(0);
}

/*
 *
 *
 *
 */
int assign_channel_frequency(unsigned char far *channel, double data)
{
  switch(get_channel_offset(channel)) {
    case AVR_OFFSET:
      AVF = data;
      break;
    case  ACR_OFFSET:
      ACF = data;
      break;
    case  BVR_OFFSET:
      BVF = data;
      break;
    case  BCR_OFFSET:
      BCF = data;
      break;
    case  CVR_OFFSET:
      CVF = data;
      break;
    case  CCR_OFFSET:
      CCF = data;
      break;
    case  DVR_OFFSET:
      DVF = data;
      break;
    case  DCR_OFFSET:
      DCF = data;
      break;
    default:
      printf(" NO Channel Set!\n");
      break;
  }
  return(0);
}

/*
```

A000011

```
 *
 *
 *
 */
int assign_channel_control(unsigned char far *channel, int data)
{
  switch(get_channel_offset(channel)) {
    case AVR_OFFSET:
      AVC = data;
      break;
    case  ACR_OFFSET:
      ACC = data;
      break;
    case  BVR_OFFSET:
      BVC = data;
      break;
    case  BCR_OFFSET:
      BCC = data;
      break;
    case  CVR_OFFSET:
      CVC = data;
      break;
    case  CCR_OFFSET:
      CCC = data;
      break;
    case  DVR_OFFSET:
      DVC = data;
      break;
    case  DCR_OFFSET:
      DCC = data;
      break;
    default:
      printf(" NO Channel Set!\n");
      break;
  }
  return(0);
}

/*
 *
 *
 *
 */
double get_channel_phase(unsigned char far *channel)
{
  switch(get_channel_offset(channel)) {
    case  AVR_OFFSET:
```

```
      return(AVP);
    case  ACR_OFFSET:
      return(ACP);
    case  BVR_OFFSET:
      return(BVP);
    case  BCR_OFFSET:
      return(BCP);
    case  CVR_OFFSET:
      return(CVP);
    case  CCR_OFFSET:
      return(CCP);
    case  DVR_OFFSET:
      return(DVP);
    case  DCR_OFFSET:
      return(DCP);
    default:
      printf(" NO Channel Set!\n");
      break;
  }
  return(0);
}


/*
 *
 *
 *
 */
double get_channel_amplitude(unsigned char far *channel)
{
  switch(get_channel_offset(channel)) {
    case AVR_OFFSET:
      return(AVA);
    case  ACR_OFFSET:
      return(ACA);
    case  BVR_OFFSET:
      return(BVA);
    case  BCR_OFFSET:
      return(BCA);
    case  CVR_OFFSET:
      return(CVA);
    case  CCR_OFFSET:
      return(CCA);
    case  DVR_OFFSET:
      return(DVA);
    case  DCR_OFFSET:
      return(DCA);
```

anacomm.c 1.14

```
    default:
      printf(" NO Channel Set!\n");
      break;
  }
  return(0);
}

/*
 *
 *
 *
 */
double get_channel_frequency(unsigned char far *channel)
{
  switch(get_channel_offset(channel)) {
    case AVR_OFFSET:
      return(AVF);
    case  ACR_OFFSET:
      return(ACF);
    case  BVR_OFFSET:
      return(BVF);
    case  BCR_OFFSET:
      return(BCF);
    case  CVR_OFFSET:
      return(CVF);
    case  CCR_OFFSET:
      return(CCF);
    case  DVR_OFFSET:
      return(DVF);
    case  DCR_OFFSET:
      return(DCF);
    default:
      printf(" NO Channel Set!\n");
      break;
  }
  return(0);
}

/*
 *
 *
 *
 */
int get_channel_control(unsigned char far *channel)
{
  switch(get_channel_offset(channel)) {
    case AVR_OFFSET:
```

A000014

```
      return(AVC);
    case  ACR_OFFSET:
      return(ACC);
    case  BVR_OFFSET:
      return(BVC);
    case  BCR_OFFSET:
      return(BCC);
    case  CVR_OFFSET:
      return(CVC);
    case  CCR_OFFSET:
      return(CCC);
    case  DVR_OFFSET:
      return(DVC);
    case  DCR_OFFSET:
      return(DCC);
    default:
      printf(" NO Channel Set!\n");
      break;
  }
  return(0);
}


/*
 *
 * This function will return address offset
 *
 */
unsigned int get_channel_offset(unsigned char far *channel)
{
  return(FP_OFF(channel));
}
```

dgctrl.c

```
/*
 * Name:        DGCTRL.C
 *
 * Company:     Nomadic Technologies
 * Author:      Jim Slater
 * Date:        4/22/94
 *
 *
 * Desciption:  This module provides an interface to the Nomadic Technologies'
 *              Rev 1.0 Digital Interface Board
 *
 * The port assignments are for 5130 PIA FPGA
 *
 * OUTPUTS
 *
 * porta[0..7]          Status Tester[0..7]
 * portb[0..7]          Status Tester[8..15]
 * portc[0..7]          Variac Data[0..7]
 * portd[0..5]          Variac Data[8..13]
 * portd[6]             Variac Servo Inhibit
 *
 * INPUTS
 *
 * porte[0..7]          Control Tester[0..7]
 * portf[0]             Variac Goal Reached (If Jumpered)
 * portf[1..5]          Unused
 * portf[6]             Manual Reset
 * portf[7]             Run
 *
 *
 * The port assignments are for 5130 pcbus/digitsal i/o FPGA
 *
 *
 * OUTPUTS
 *
 * port2a[0..7]          Unused
 * port2b[0..7]          Unused
 * port2c[0..7]          Unused
 *
 * INPUTS
 *
 * none
 *
 */
```

[redacted]

dgctrl.c

```
#include <stdio.h>
#include <stdlib.h>
#include <bios.h>
#include <string.h>
#include <conio.h>
#include <dos.h>
#include <math.h>
#include <float.h>
#include "dgctrl.h"


/*#define TESTMODE*/

#define PORTA_OFFSET       0x100
#define PORTB_OFFSET       0x101
#define PORTC_OFFSET       0x102
#define PORTD_OFFSET       0x103
#define PORTE_OFFSET       0x106
#define PORTF_OFFSET       0x107
#define PORT2A_OFFSET      0x0
#define PORT2B_OFFSET      0x1
#define PORT2C_OFFSET      0x3


/* address pointers for data ports */
typedef struct {
  unsigned char port2a;
  unsigned char port2b;
  unsigned char port2c;
  unsigned char buffer[253];
  unsigned char porta;
  unsigned char portb;
  unsigned char portc;
  unsigned char portd;
/*  unsigned char buffer2[2];*/
  unsigned char porte;
  unsigned char portf;
} DigitalPorts;


DigitalPorts far *ports;   /* declare the structure pointer for the digital control board

/*
 *  Init digital ports wil assign the address to the address pointer
 */
void initdigitalports(unsigned int base)
{
```

dgctrl.c

```
  ports   = ( DigitalPorts far *) MK_FP(base,0);
}
/*
 *
 */
void set_outbit(int bit)
{
int mask;

  mask = 0x1;

  if ((bit > 7) & (bit <= 0xf)) {
        mask = mask << (bit - 8);
        ports->portb |= mask;
  } else {
        if ((bit <= 8) & (bit >= 0x0)) {
        mask = mask << bit;
        ports->porta |= mask;
        }
  }
}

/*
 *
 */
void clear_outbit(int bit)
{

int mask;

mask = 0x1;

  if ((bit > 7) & (bit <= 0xf)) {
        mask = mask << (bit - 8);
        mask = ~mask;
        ports->portb &= mask;
  } else if ((bit <= 7) & (bit >= 0x0)) {
        mask = mask << bit;
        mask = ~mask;
        ports->porta &= mask;
  }
}


/*
 *
```

[redacted]

dgctrl.c

4

```
 */
int setoutportbit(int bit, int data)
{

if (data)
  set_outbit(bit);
else
  clear_outbit(bit);

return 0;
}

/*
 *
 */
unsigned int getoutportbit(int bit)
{
  unsigned char mask;
  mask = 0x1;
  if ((bit > 7) & (bit < 0xf)) {
        mask = mask << (bit - 8);
        return(ports->portb & mask);
  } else {
        mask = mask << bit;
        return(ports->porta & mask);
  }
}

/*
 *
 */
unsigned int getoutport()
{
 return(ports->porta + (ports->portb << 8));
}

/*
 *
 */
int setoutport(unsigned int data)
{
  unsigned char lsb, msb;

  lsb = data & 0xff;
  msb = data >> 8;
  ports->porta  = lsb;
  ports->portb  = msb;
```

[redacted]

dgctrl.c

```
  return 0;
}

/*
 *
 */
unsigned int getinportbit(int bit)
{
  unsigned char mask;
  mask = 0x1;
  if ((bit > 7) & (bit <= 0xf)) {
        mask = mask << (bit - 8);
        return(ports->portf & mask);
  } else {
        mask = mask << bit;
        return(ports->porte & mask);
  }
}

/*
 *
 */
unsigned int getinport()
{
 return(ports->porte + (ports->portf << 8));
}


/*
 *
 */
unsigned int getvariac()
{
 return(ports->portc + (ports->portd << 8));
}

/*
 *
 */
int setvariac(unsigned int data)
{
  unsigned char lsb, msb;

  lsb = data & 0xff;
  msb = data >> 8;
  msb |= 0x40;
```

dgctrl.c

```
  ports->portc  = lsb;
  ports->portd  = msb;

  return 0;
}

#ifdef TESTMODE

void main()
{
int temp, command;
char datastring[50];

  initdigitalports(0xd180);

  temp = command = 0;
  while (command != 'q') {

        if (kbhit()) {
          command = getche();

          switch(command) {
                case 'R':
                  printf("\nEnter Relay to be turned On->");
                  gets(datastring);
                  printf("\n");
                  temp = atoi(datastring);
                  temp &=0xf;
                  setoutportbit(temp,1);
                  break;
                case 'r':
                  printf("\nEnter Relay to be turned off->");
                  gets(datastring);
                  printf("\n");
                  temp = atoi(datastring);
                  temp &=0xf;
                  setoutportbit(temp,0);
                  break;
                case 'v':
                  printf("\nEnter value for Variac->");
                  gets(datastring);
                  printf("\n");
                  temp = atoi(datastring);
                  setvariac(temp);
                  break;
                case 'o':
                  printf("\nEnter value for Outport->");
```

dgctrl.c

```
      gets(datastring);
      printf("\n");
      temp = atoi(datastring);
      setoutport(temp);
      break;
    case 'i':
      printf("Inport = %x\n",getinport());

      break;
        }
      }
  }
}

#endif
```

A000022

[redacted]

gltime.c

```
#include <dos.h>
#include <bios.h>


typedef union
{
struct
        {
        unsigned char   b0;
        unsigned char   b1;
        unsigned char   b2;
        unsigned char   b3;
        }  b;

struct
        {
        unsigned int    l;
        unsigned int    h;
        }  w;

unsigned long int       lw;

}timer_type;

/* global */
static unsigned long far *ptr;


/*****************************************************

         set the timer to its mode 2

/****************************************************/
void timer_open(void)
{
outportb(0x43,0x34);          /* set counter 0 to mode 2 */

outportb(0x40,0x0);                              /* set counter value to 0 */
outportb(0x40,0x0);

ptr = MK_FP(0x0040,0x006c);     /* get the address of the bios counter */
}
```

gltime.c

```
/*****************************************************
        read the current value of the timer
/*****************************************************/
long timer_read(void)
{
timer_type begin, end;
timer_type gltime;


begin.lw = *ptr;                   /* read the bios counter to check for rollover */

outportb(0x43,0x06);            /* latch the counter */

gltime.b.b0 = inportb(0x40);    /* read the lsb of the counter */
gltime.b.b1 = inportb(0x40);    /* read the msb of the counter */

end.lw = *ptr;                          /* read the bios counter again */

gltime.w.l = ~gltime.w.l;               /* make a count down counter into a count up conter */

gltime.w.l++;

                                                                       /* this section checks to see if the timer i
nterrupt occured during our read */

if (end.lw == begin.lw)                 /* if the bios counter has not changed during our read */
        gltime.w.h = begin.w.l;         /* use the first bios value read */
else
        {
        if (gltime.w.l > 0x8000)        /* if they're not equal then choose which one to use */
                {
                gltime.w.h = begin.w.l; /* if it recently rolled over then use the initial value */
                }
        else
                {
                gltime.w.h = end.w.l;   /* if it rolled over "a long time ago" then use the recent value */
                }
        }
return((long) gltime.lw);

}

/****************************************************

        set the timer to its default settings

/****************************************************/
```

A000024 gltime.c

```
void timer_close(void)
{
outportb(0x43,0x36);          /* set counter 0 to mode 3 */

outportb(0x40,0x0);           /* set counter to 0 */
outportb(0x40,0x0);
}

/*

int main()
{
unsigned long begin, end, duration;

float seconds;

int done = 0;

timer_open();

while(!done)

{

                printf("Hit key to start timing and again to stop timing\n");
                getch();
                begin = timer_read();

                while(!kbhit())
                        ;

                delay(1001);
                end = timer_read();

                getch();

                duration = end - begin;

                printf("begin = %lu end = %lu duration = %lu\n",begin, end, duration);

                seconds = (float)duration/1193180.0;

                printf("seconds = %f\n",seconds);

                done = getchar();

                if (done = 'q')
```

A000025

[redacted]

gltime.c

4

```
                done = 1;
          else
                done = 0;

}


timer_close();
return(0);
}

*/
```

A000026 preamp.c

```
/*
 * Name:        PREAMP.C
 *
 * Company:     Nomadic Technologies
 * Author:      Jim Slater
 * Date:        4/22/94
 *
 * Compiler     Borland C 3.1
 *
 * Desciption:  This module provides an interface to the Nomadic Technologies'
 *              Rev 1.0 Digital Preamp Board
 *
 * Revisions:   Date                Content
 *
 *   JCS        19-jun-94           added data structures for full
 *                                  scale gain control and calibration
 *
 *
 *
 *
 * The port assignments are for 5130 preampan analog control FPGA
 *
 * DAC SECTION OUTPUTS
 *
 * dacdatal[0..7]         dacdata[0..7]    DAC databits 0 - 7
 * dacdatah[0..5]         dacdata[8..13]   DAC databits 8-13
 * dacdatah[6..7]         UNUSED
 * dacctrl[0..6]          wr for the six DACS
 * dacctrl[7]             ldac for ALL six DACS
 *
 * DAC SECTION INPUTS
 *
 * none
 *
 * AD SECTION OUTPUTS
 *
 * adctrl[0..2]          muxaddress[0..2]  mux address bits 0-2
 * adctrl[3]             analog switch for RMS feedback
 * adctrl[4]             analog switch for direct signal feedback
 * adctrl[5]             /cs AD control pin - low for stand alone
 * adctrl[6]             R//C AD control pin - toggle for stand alone
 * adctrl[7]             ce AD control pin - high for stand alone
 *
 *
 * AD SECTION INPUTS
 *
 * addatal[0..7]          addata[0..7]   AD databits 0-7
```

[redacted]

preamp.c

[redacted]

```
 * addatah[0..4]          addata[8..11]  AD databits 8-11
 * addatah[5..7]          UNUSED
 *
 *
 * The port assignments are for 5130 preampdg digital control FPGA
 *
 *
 * RELAY SECTION OUTPUTS
 *
 * relayctrll[0..5]      relay control for relays 0 - 5
 *                                   evens are used for output enable on voltage amps
 *                       odds are unused on voltage amps
 *                                   evens are used for calibration on current amps
 *                                   odds are used for output enable on current amps
 * relayctrll[6..7]      UNUSED
 * relayctrlh[0..5]      relay control for relays 6 - 11
 *                                   evens are used for output enable on voltage amps
 *                                   odds are unused on voltage amps
 *                                   evens are used for calibration on current amps
 *                                   odds are used for output enable on current amps
 * relayctrlh[6..7]      UNUSED
 *
 * RELAY SECTION INPUTS
 *
 * none
 *
 * ID SECTION OUTPUTS
 *
 * none
 *
 * ID SECTION INPUTS
 *
 * id[0..7]              board id inputs set by dip switch 3
 *
 */


#include <stdio.h>
#include <stdlib.h>
#include <bios.h>
#include <string.h>
#include <conio.h>
#include <ctype.h>
#include <dos.h>
#include <math.h>
#include <float.h>
```

[redacted]

preamp.c

3

```
#include "preamp.h"

//#define TESTMODE

#define DACDATAL_OFFSET    0x100
#define DACDATAH_OFFSET    0x101
#define DACCTRL_OFFSET     0x102
#define ADCTRL_OFFSET      0x103
#define ADDATAL_OFFSET     0x106
#define ADDATAH_OFFSET     0x107
#define RELAYCTRLL_OFFSET   0x0
#define RELAYCTRLH_OFFSET   0x1
#define BOARDID_OFFSET      0x3

#define VOLTAGE_GAIN_EVENT  0x1
#define CURRENT_GAIN_EVENT  0x0

/* address pointers for data ports */
typedef struct {
  unsigned char relayctrll;
  unsigned char relayctrlh;
  unsigned char boardid;
  unsigned char buffer[253];
  unsigned char dacdatal;
  unsigned char dacdatah;
  unsigned char dacctrl;
  unsigned char adctrl;
  unsigned char buffer2[2];
  unsigned char addatal;
  unsigned char addatah;
} PreampPorts;

typedef struct {
  int id;
  int init_setting;
  int current_setting;
  int fsg_index;
  int fsg_table[19];
  double cal_table[19];
} channeltype;

channeltype vfsg_default = {
  0xffff,
  0x0000,
  0x0000,
  0x0000,
```

A000029 preamp.c

```
  {0,880,1760,2639,3518,
  4398,5278,6156,7036,7917,
  8792,9676,10556,11436,12315,
  13196,14077,14957,15800},

  {0,122.70,247.40,372.20,496.98,
   621.90,746.65,871.43,996.33,1121.31,
   1246.13,1371.13,1495.99,1621.33,1746.18,
   1871.29,1996.25,2121.06,2246.15}
};

channeltype cfsg_default = {
  0xffff,
  0x0000,
  0x0000,
  0x0000,
  {0,1136,2273,3409,4546,
   5682,6819,7956,9091,10229,
   11365,12502,13638,14776,15913,
   16383,16383,16383,16383},

  {2000,2100,2200,2300,2400,
   2500,2600,2700,2800,2900,
   3000,3100,3200,3300,3400,
   3500,3600,3700,3800}
};

channeltype vfsg[7], cfsg[6];


PreampPorts far *preamp[2];    /* declare the structure pointer for the preamp boards



/*
 *  gain_init will build the gain tables from a setup file
 *  if available or the default table
 */
void fsg_init(void)
{
int channel_counter, table_counter;

for (channel_counter = 0;channel_counter < 7;channel_counter++) {
  vfsg[channel_counter].init_setting = vfsg_default.init_setting;
  vfsg[channel_counter].fsg_index = vfsg_default.fsg_index;
```

A000030 preamp.c

```
  write_to_dac(vfsg[channel_counter].init_setting,channel_counter,0);

  for (table_counter = 0;table_counter < 19;table_counter++) {
        vfsg[channel_counter].fsg_table[table_counter] = vfsg_default.fsg_table[table_counter];
        vfsg[channel_counter].cal_table[table_counter] = vfsg_default.cal_table[table_counter];
  }
}

for (channel_counter = 0;channel_counter < 6;channel_counter++) {
  cfsg[channel_counter].init_setting = cfsg_default.init_setting;
  cfsg[channel_counter].fsg_index = cfsg_default.fsg_index;
  write_to_dac(cfsg[channel_counter].init_setting,channel_counter,1);
  for (table_counter = 0;table_counter < 19;table_counter++) {
        cfsg[channel_counter].fsg_table[table_counter] = cfsg_default.fsg_table[table_counter];
        cfsg[channel_counter].cal_table[table_counter] = cfsg_default.cal_table[table_counter];
  }
}

load_fsg_file(0, 0);
load_fsg_file(1, 0);
load_fsg_file(2, 0);
load_fsg_file(3, 0);
load_fsg_file(4, 0);
load_fsg_file(5, 0);

load_fsg_file(0, 1);
load_fsg_file(1, 1);
load_fsg_file(2, 1);


load_cal_file(0, 0);
load_cal_file(1, 0);
load_cal_file(2, 0);
load_cal_file(3, 0);
load_cal_file(4, 0);
load_cal_file(5, 0);


}

/*
 *  preamp_init will assign the addresses to the address pointers,
 */
unsigned char preamp_init(unsigned int base, int id)
{
  preamp[id]   = ( PreampPorts far *) MK_FP(base,0);
```

preamp.c

```
  preamp[id]->dacctrl = 0xff;  /* set the DAC control lines to there off state */
  preamp[id]->adctrl = 0xc0;   /* set ADC control lines to the non active state */

  return (preamp[id]->boardid) ;  /* return the board ID */
}

/*
 *  select dac will pull the wr line for the specified dac low
 *  valid dac num are 0-6
 */
void select_dac(int dac_num, int id)
{
int mask;

  mask = 0x1;
  mask = mask << dac_num;
  mask = ~mask;
  preamp[id]->dacctrl &= mask;
}

/*
 *  deselect dac will pull the wr line for the specified dac high
 *  valid dac num are 0-6
 */
void deselect_dac(int dac_num, int id)
{
int mask;

  mask = 0x1;
  mask = mask << dac_num;
  preamp[id]->dacctrl |= mask;
}


/*
 *  select relay will energize the coil for the selected relay
 *  valid relay numbers are 0-15
 */
void select_relay(int relay_num, int id)
{
int mask;

  mask = 0x1;

  if ((relay_num > 7) & (relay_num <= 0xf)) {
        mask = mask << (relay_num - 8);
        preamp[id]->relayctrlh |= mask;
```

[redacted]

preamp.c

7

```
  } else {
        if ((relay_num <= 7) & (relay_num >= 0x0)) {
        mask = mask << relay_num;
        preamp[id]->relayctrll |= mask;
        }
  }
}

/*
 *  deselect relay will deenergize the coil for the selected relay
 *  valid relay numbers are 0-15
 */
void deselect_relay(int relay_num, int id)
{

int mask;

mask = 0x1;

  if ((relay_num > 7) & (relay_num <= 0xf)) {
        mask = mask << (relay_num - 8);
        mask = ~mask;
        preamp[id]->relayctrlh &= mask;
  } else if ((relay_num <= 7) & (relay_num >= 0x0)) {
        mask = mask << relay_num;
        mask = ~mask;
        preamp[id]->relayctrll &= mask;
  }
}

/*
 *  select ldac will pull the ldac line low
 */
void select_ldac(int id)
{
preamp[id]->dacctrl &= 0x7f;
}

/*
 *  deselect ldac will pull the ldac line high
 */
void deselect_ldac(int id)
{
preamp[id]->dacctrl |= 0x80;
}

/*
```

[redacted]

preamp.c

```
 *  toggle ldac will pull the ldac line low then high
 */
void toggle_ldac(int id)
{
int dummy;

select_ldac(id);
dummy = 0;
dummy = dummy;
dummy = 0;
deselect_ldac(id);
}

/*
 *  set dac data will set the 14 data bits of dacs
 */
void set_dac_data(int data, int id)
{
unsigned char lsb,msb;

msb = (data & 0x3f00) >> 8;
lsb = data & 0xff;

preamp[id]->dacdatal = lsb;
preamp[id]->dacdatah = msb;
}


/*
 *  get dac data will return the 14 data bits of dacs
 */
int get_dac_data(int id)
{
unsigned char lsb,msb;
int data;

lsb = preamp[id]->dacdatal;
msb = (preamp[id]->dacdatah & 0x3f);

data = (msb << 8) + lsb;

return (data);
}

/*
 *  write to dac will write and data and toggle the control lines
 */
```

preamp.c

```
void write_to_dac(int data, int dac_num, int id)
{

if (id)
  cfsg[dac_num].current_setting = data;
else
  vfsg[dac_num].current_setting = data;


//printf("vfsg[dac_num].current_setting = %d data = %d \n",vfsg[dac_num].current_setting, data);


select_dac(dac_num,id);
set_dac_data(data,id);
deselect_dac(dac_num,id);
toggle_ldac(id);
}

/*
 *  set vfsg
 *
 */
void set_vfsg(double value,unsigned char type)
{

int index;

  index = (value + 0.5);


  printf("setting gain on channels 0-2 to %d DAC(%d)\n",index,vfsg[0].fsg_table[index]);

  if (type) {
//   printf("setting gain on channels 3-5 to %d DAC(%d)\n",index,vfsg[0].fsg_table[index]);
        set_fsg_channel(value,3,0);
        set_fsg_channel(value,4,0);
        set_fsg_channel(value,5,0);
/*      write_to_dac(vfsg[3].fsg_table[index],3,0);
        write_to_dac(vfsg[4].fsg_table[index],4,0);
        write_to_dac(vfsg[5].fsg_table[index],5,0);*/
  } else {
//  printf("setting gain on channels 0-2 to %d DAC(%d)\n",index,vfsg[0].fsg_table[index]);
        set_fsg_channel(value,0,0);
        set_fsg_channel(value,1,0);
        set_fsg_channel(value,2,0);
/*      write_to_dac(vfsg[0].fsg_table[index],0,0);
        write_to_dac(vfsg[1].fsg_table[index],1,0);
```

preamp.c

```
        write_to_dac(vfsg[2].fsg_table[index],2,0);*/
  }

}

/*
 *  set fsg
 *
 */
void set_fsg_channel(double value,int channel,unsigned char id)
{
int index;

  index = (value + 0.5);
  if (id) {
        cfsg[channel].fsg_index = value;
        write_to_dac(cfsg[channel].fsg_table[index],channel,id);
  }
  else {
        vfsg[channel].fsg_index = value;
        write_to_dac(vfsg[channel].fsg_table[index],channel,id);
  }
}

/*
 *  get fsg
 *
 */
int get_fsg_channel(int channel,unsigned char id)
{

  if (id) {
        return(cfsg[channel].fsg_index);
  }
  else {
        return(vfsg[channel].fsg_index);
  }

}


/*
 *  set cfsg
 *
 */
void set_cfsg(double value,unsigned char type)
{
```

preamp.c

```
  if (!type) {
        set_fsg_channel(value,0,1);
        set_fsg_channel(value,1,1);
        set_fsg_channel(value,2,1);
  }

}


/*
 *  correct DAC
 */
int correct_dac(int correction,int channel,int id)
{
int new_value;


  if (id)
        new_value = cfsg[channel].current_setting + correction;
  else
        new_value = vfsg[channel].current_setting + correction;


  if (new_value < 0)
        new_value = 0;

  if (new_value > 0x3fff)
        new_value = 0x3fff;

  printf("current = %d correction = %d new_value = %d\n\n",vfsg[channel].current_setting,correction , new_value);

  write_to_dac(new_value,channel,id);

  return(new_value);

}


/*
 *  get dac correction
 *
 */
int get_dac_correction( double error)
{
int sign;
```

A000037 preamp.c

12

```
double abs_error;

  if (error > 0) {
        sign = 1;
  } else {
        if  (error < 0)
          sign = -1;
        else return(0);
  }

  abs_error = fabs(error);

  if (abs_error > 100)
        return(4*abs_error*sign);

  if (abs_error > 10)
        return(2*abs_error*sign);

  if (abs_error > 1)
        return(abs_error*sign);
  else
        return(sign);

}

/*
 *  get ad average
 *
 */
double get_ad_average(int channel,int id)
{
double data;
int average_counter;

  data = 0.0;

  for (average_counter = 0;average_counter <1000;average_counter++) {
        data += read_ad(id);
        delay(0);
  }

  data =  data / 1000;

return(data);
}

/*
```

[redacted] preamp.c 13

```
 *  get calibration error
 *
 */
double get_cal_error( int full_scale_value,int channel,int id)
{
double data;

  select_ad_channel(channel,id);

  data = get_ad_average(channel,id);


  printf("AD = %f Goal = %f error = %f\n",data,vfsg[channel].cal_table[full_scale_value],vfsg[channel].cal_table[full_sca
alue] - data);

  if (id)
        return(cfsg[channel].cal_table[full_scale_value] - data);
  else
        return(vfsg[channel].cal_table[full_scale_value] - data);
}

/*
 *   calibrate channel level
 */
int calibrate_channel_level(int level,int channel,int id)
{
int dac_correction, dac_level,loop_counter,modified;
double error;
loop_counter = 0;
modified = 0;

  printf("\nCalibrating Channel %d\n",channel);

  if (id)
        write_to_dac(cfsg[channel].fsg_table[level],channel,0);
  else
        write_to_dac(vfsg[channel].fsg_table[level],channel,0);

  delay(10000);

  do {
        error = get_cal_error(level, channel, id);
        dac_correction = get_dac_correction(error);
        if (fabs(error) > 0.05) {
          modified = 1;
          dac_level = correct_dac(dac_correction,channel,id);
        }
```

```
        if (fabs(error) > 10.0)
          delay(1000);
        else if(fabs(error) > 1.0)
          delay(2000);
        else
          delay(3000);

        if(loop_counter++ > 200) {
          printf("***** Unable to Converge to calibrated value min error = %f\n",error);

          break;
        }
   } while (fabs(error) > 0.05);

        if (fabs(error) <= 0.05 && modified)
          vfsg[channel].fsg_table[level] = dac_level;

return (error);

}


/*
 *  save fsg file
 *
 */
int save_fsg_file(int channel,int id)
{

FILE *calfile;
int cal_counter;
char channelnum[10],filename[30];

  itoa(channel, channelnum, 10);

  if (!id)
        strcpy(filename,"voltch_");
  else
        strcpy(filename,"ampch_");

  strcat(filename,channelnum);
  strcat(filename,".fsg");

//  printf("saving to %s \n",filename);

  if ((calfile  = fopen(filename,"w")) == NULL) {
        printf("error opening %s \n",filename);
```

A000040

[redacted]

preamp.c

15

```
        delay(1000);
        return(0);
  }

  for (cal_counter = 0;cal_counter <19; cal_counter++) {
//      printf("FSG = %d\n",vfsg[channel].fsg_table[cal_counter]);
        fprintf(calfile,"%d\n",vfsg[channel].fsg_table[cal_counter]);
  }

  fclose(calfile);

  return(1);
}

/*
 *  load fsg file
 *
 */
int load_fsg_file(int channel,int id)
{

FILE *calfile;
int cal_counter;
char channelnum[10],filename[30], data[100];

  itoa(channel, channelnum, 10);

  if (!id)
        strcpy(filename,"voltch_");
  else
        strcpy(filename,"ampch_");

  strcat(filename,channelnum);
  strcat(filename,".fsg");

//  printf("loading %s \n",filename);

  if ((calfile  = fopen(filename,"r")) == NULL) {
        printf("error opening %s \n",filename);
        delay(1000);
        return(0);
  }

  for (cal_counter = 0;cal_counter <19; cal_counter++) {
        if (fgets(data,100,calfile) == NULL) {
          return(0);
        }
```

A000041 preamp.c

```
        if (!id) {
          vfsg[channel].fsg_table[cal_counter] = atoi(data);
//        printf("FSG = %d\n",vfsg[channel].fsg_table[cal_counter]);
        }
        else {
          cfsg[channel].fsg_table[cal_counter] = atoi(data);
//        printf("FSG = %d\n",cfsg[channel].fsg_table[cal_counter]);
        }
  }


  fclose(calfile);

  return(1);
}

/*
 *  load cal file
 *
 */
int load_cal_file(int channel,int id)
{

FILE *calfile;
int cal_counter;
char channelnum[10],filename[30], data[100];

  itoa(channel, channelnum, 10);

  if (!id)
        strcpy(filename,"voltch_");
  else
        strcpy(filename,"ampch_");

  strcat(filename,channelnum);
  strcat(filename,".cal");

  printf("loading %s \n",filename);

  if ((calfile  = fopen(filename,"r")) == NULL) {
        printf("error opening %s \n",filename);
        delay(1000);
        return(0);
  }

  for (cal_counter = 0;cal_counter <19; cal_counter++) {
        if (fgets(data,100,calfile) == NULL) {
```

[redacted]

preamp.c

17

```
        return(0);
        }
        vfsg[channel].cal_table[cal_counter] = atof(data);
//      printf(" CAL = %f\n",vfsg[channel].cal_table[cal_counter]);
  }

  fclose(calfile);

  return(1);
}


void calibrate_channel(channel,id,max_level)
{

int level;

  for (level = 1;level <= max_level;level++) {
        calibrate_channel_level(level, channel, id);
        delay(1000);
  }
}



/*
 *  set v vgain
 *
 */
void set_v_gain(unsigned int value,unsigned char type)
{
if (type) {
  write_to_dac(value,3,0);
  write_to_dac(value,4,0);
  write_to_dac(value,5,0);
} else {
  write_to_dac(value,0,0);
  write_to_dac(value,1,0);
  write_to_dac(value,2,0);
}

}

/*
 *  set c  gain
 *
```

A000043 preamp.c

18

```
 */
void set_c_gain(unsigned int value,unsigned char type)
{
if (!type) {
  write_to_dac(value,0,1);
  write_to_dac(value,1,1);
  write_to_dac(value,2,1);
}


}


/*
 *  select AD(mux) channel will set the address lines
 *  on the DG508 MUX
 */
void select_ad_channel(int channel, int id)
{
unsigned char mask;

channel &= 0x7;             /* make sure that channel < 8 */
mask = preamp[id]->adctrl;  /* read the current state of the ctrl lines */
mask &= 0xf8;                /* zero out the current address lines */
mask |= channel;            /* set the new ones */
preamp[id]->adctrl = mask;  /* assign it to the port */
}

/*
 *  set AD mode 0 = no connect 1 = RMS 2 = Direct
 */
void set_ad_mode(int mode, int id)
{
unsigned char mask;

mask = preamp[id]->adctrl; /* read the current state of the ctrl lines */
mask &= 0xe7;

  switch (mode) {
        case 0:      /* no mode */
          break;
        case 1:
          mask |= 0x8;            /* set the new ones */
          break;
        case 2:
          mask |= 0x10;
          break;
```

A000044 preamp.c

19

```
}
preamp[id]->adctrl = mask; /* assign it to the port */
}


/*
 *  select rc will pull the rc line low
 */
void select_rc(int id)
{
preamp[id]->adctrl &= 0xbf;
}

/*
 *  deselect rc will pull the rc line high
 */
void deselect_rc(int id)
{
preamp[id]->adctrl |= 0x40;
}

/*
 *  toggle rc will pull the rc line low then high
 */
void toggle_rc(int id)
{
int dummy;

select_rc(id);
dummy = 0;
dummy = dummy;
deselect_rc(id);
}

/*
 *  get ad data will return the 12 data bits of the AD
 */
int get_ad_data(int id)
{
unsigned char lsb,msb;
int data;

lsb = preamp[id]->addatal;
msb = (preamp[id]->addatah & 0xf);

data = (msb << 8) + lsb;
```

A000045 preamp.c

20

```
return (data);
}


/*
 *  read_ad will toggle the control lines and read the data
 */
int read_ad(int id)
{
toggle_rc(id);
return (get_ad_data(id));
}



#ifdef TESTMODE

void display_menu(int channel, int fsg, int id)
{

  printf("\nPreamp Test Menu  Channel = %d  FSG = %d  ID = %d\n",channel,fsg,id);
  printf("-----------------\n");
  printf("+    increment dac\n");
  printf("-    deccrement dac\n");
  printf("a    print ad value\n");
  printf("c    change channel\n");
  printf("d    change delta\n");
  printf("i    change id\n");
  printf("j    complete channel calibration\n");
  printf("k    kalibrate channel\n");
  printf("r    set relay\n");
  printf("m    change AD measurement mode\n");
  printf("n    set dac value\n");
  printf("o    set current sensor output type \n");
  printf("v    set voltage sensors full scale \n");
  printf("x    set current output sensors full scale \n");
  printf("p    load cal file\n");
  printf("l    load fsg file\n");
  printf("s    save fsg file\n");
  printf("t    run cycle test\n");

}

void main()
{
```

preamp.c

```
int gain_count, command, channel,id,relay,relay_num, ave_count;
char datastring[50];
int delta,fsg;
double addata;
int current_output_type;


  preamp_init(0xd100,0);
  preamp_init(0xd140,1);

  fsg_init();
  fsg = 0;
  gain_count = command = 0;

  current_output_type = VOLTAGE_GAIN_EVENT;

  id = 0;

  delta = 10;

  channel = 0;

  select_relay(0,id);

  select_ad_channel(channel,id);
  set_ad_mode(1,id);
  display_menu(channel,fsg,id);

  while (command != 'q') {


        if (kbhit()) {
          command = getche();

          switch(tolower(command)) {
                case '+':
                  gain_count += delta;
                  write_to_dac(gain_count,channel,id);
                  break;
                case '-':
                  gain_count -= delta;
                  write_to_dac(gain_count,channel,id);
                  break;
                case 'a':
                  printf("AD = %d\n",read_ad(id));
                  break;
                case 'c':
```

preamp.c

```
  printf("\nEnter channel ->");
  gets(datastring);
  printf("\n");
  channel = atoi(datastring);
  select_ad_channel(channel,id);
  break;
case 'd':
  printf("\nEnter Delta value for +/-(%d) -> ",delta);
  gets(datastring);
  printf("\n");
  delta= atoi(datastring);
  break;
case 'v':
  printf("\nEnter Volts Full Scale Gain (%d) -> ");
  gets(datastring);
  printf("\n");
  fsg = atoi(datastring);
  set_vfsg(fsg,current_output_type);
  gain_count = vfsg[channel].fsg_table[fsg];
  break;
case 'x':
  printf("\nEnter Current Full Scale Gain (%d) -> ");
  gets(datastring);
  printf("\n");
  fsg = atoi(datastring);
  if (current_output_type) {
        set_vfsg(fsg,0);
        gain_count = vfsg[channel].fsg_table[fsg];
  } else {
        set_cfsg(fsg,current_output_type);
        gain_count = cfsg[channel].fsg_table[fsg];
  }
  break;
case 'i':
  printf("\nEnter id %d -> ",id);
  gets(datastring);
  printf("\n");
  id = atoi(datastring);
  break;

case 'k':
  printf("\nKalibrating Channel (%d) -> ");
  calibrate_channel_level(fsg,channel,id);
  break;

case 'j':
  printf("\nComplete Channel Calibration ");
```

23 preamp.c

```
  calibrate_channel(channel,id,18);
  break;
case 'r':
  printf("\nEnter relay  ->");
  gets(datastring);
  printf("\n");
  relay_num = atoi(datastring);
  printf("\nEnter relay data 1 or 0 ->");
  gets(datastring);
  printf("\n");
  relay = atoi(datastring);
  if (relay)
        select_relay(relay_num,id);
  else
        deselect_relay(relay_num,id);
  break;
case 'm':
  printf("\nEnter Mode ->");
  gets(datastring);
  printf("\n");
  gain_count = atoi(datastring);
  gain_count &=0x3;
  set_ad_mode(gain_count,id);
  break;
case 'n':
  printf("\nEnter value ->");
  gets(datastring);
  printf("\n");
  gain_count = atoi(datastring);
  gain_count &=0x3fff;
  write_to_dac(gain_count,channel,id);
  break;
case 'l':
  load_fsg_file(channel,id);
  break;

case 'o':
  printf("\nEnter Current_Output_Type 1 = Volts 0 = Amps (%d) -> ",current_output_type);
  gets(datastring);
  printf("\n");
  current_output_type = atoi(datastring);
  break;

case 'p':
  load_cal_file(channel,id);
  break;
```

A000049 preamp.c

```
              case 's':
                save_fsg_file(channel,id);
                break;

              case 't':
                for (gain_count = 0; gain_count < 0x3fff; gain_count+=10) {
                      gain_count &=0x3fff;
                      write_to_dac(gain_count,channel,id);
                      printf("AD = %6d  ",read_ad(id));
                      printf("Gain = %6d\n",gain_count);
                      delay(1);
                }
                for (gain_count = 0; gain_count < 0x3fff; gain_count+=10) {
                      write_to_dac(0x3fff-gain_count,channel,id);
                      printf("AD = %6d  ",read_ad(id));
                      printf("Gain = %6d\n",0x3fff - gain_count);
                      delay(1);
                }
              break;

              case 'z':
               addata = 0;
               for (ave_count = 0;ave_count < 10000; ave_count++) {
                 addata += read_ad(id);
                 delay(1);
               }
               addata = addata/10000;
               printf("10000 sample AD Average = %f\n",addata);
               break;

              case '?':
               display_menu(channel,fsg,id);
               break;
        }

      }
  }
  delay(100);
  deselect_relay(0,id);
}
#endif
```

[redacted]

testscrp.c

```
#include <stdlib.h>
#include <stdio.h>
#include <bios.h>
#include <string.h>
#include <conio.h>
#include <dos.h>
#include <math.h>
#include <float.h>
#include <ctype.h>
#include <string.h>

#include "anacomm.h"
#include "preamp.h"
#include "dgctrl.h"
#include "gltime.h"
#include "sse.h"

#define DISKFILE 1
#define SCREEN 0


#define MAXEVENTS        1000
#define TIM_FREQ         60
#define COUNTER_FREQ     1193800
#define TICKSPERCYCLE    19897L


#define POLE_AC  0x0
#define POLE_AV  0x1
#define POLE_BC  0x2
#define POLE_BV  0x3
#define POLE_CC  0x4
#define POLE_CV  0x5
#define POLE_DC  0x6
#define POLE_DV  0x7

#define DA       0x8

#define ST       0x9

#define CT       0xa

#define GN       0xb

#define RS       0xc

#define SV       0xd
```

A000051

[redacted] testscrp.c 2

```
#define PHASE_EVENT        0x0
#define AMPLITUDE_EVENT    0x1
#define FREQUENCY0_EVENT   0x2
#define FREQUENCY1_EVENT   0x3
#define VOLTAGE_GAIN_EVENT  0x1
#define CURRENT_GAIN_EVENT  0x0

#define POLE_MASK          0xf0
#define TYPE_MASK          0x0f

#define PEAK_AMP_MODE      0x0
#define RMS_AMP_MODE      0x1

#define ABS_PHASE_MODE      0x0
#define REL_PHASE_MODE      0x1

#define AMP_OUTPUT      0x1
#define VOLTAGE_OUTPUT      0x0


int             event_cycle[MAXEVENTS];
unsigned char   event_type[MAXEVENTS];
double          event_data[MAXEVENTS];
int             control_cycle[MAXEVENTS];
unsigned char   control_data[MAXEVENTS];
unsigned char   control_channel[MAXEVENTS];
int             control_index = 0;

int init_flag = 0;

int             Repeat = 1;
int             Amplitude_Type = RMS_AMP_MODE;
int             Phase_Type  = ABS_PHASE_MODE;
int             Current_Type  = VOLTAGE_OUTPUT;

double Voltage_Gain, Current_Gain;
/*unsigned int voltage_gain_table[19] = {0,798,1589,2383,3178,
                                3970,4764,5559,6353,7147,
                                7941,8735,9530,10324,11119,
                                11914,12709,13503,14299};

unsigned int current_gain_table[18] = {0,1796,3585,5367,7141,
                                8914,10722,12509,13500,13500,
                                13500,13500,13500,13500,13500,
                                13500,13500,13500};
```

A000052

[redacted]

testscrp.c

3

```
*/
unsigned char far *active_control_channel;
unsigned char far *active_dds_channel;
unsigned int active_channel_number;

int main()
{

  timer_open();

  address_init();
  preamp_init(0xd100,0);
  preamp_init(0xd140,1);

  fsg_init();

  select_relay(0,0);
  select_relay(2,0);
  select_relay(4,0);
  select_relay(8,0);
  select_relay(10,0);
  select_relay(12,0);

/*  select_relay(8,1);
  select_relay(10,1);
  select_relay(12,1); */

  initdigitalports(0xd180);

  setup();

  setphase(0.0,accs,acr);
  setphase(0.0,avcs,avr);
  setphase(120.0,bccs,bcr);
  setphase(120.0,bvcs,bvr);
  setphase(240.0,cccs,ccr);
  setphase(240.0,cvcs,cvr);
  setphase(180.0,dccs,dcr);
  setphase(180.0,dvcs,dvr);

  initialize_script();

  main_menu();

  timer_close();
  signal_close();
```

A000053

[redacted]

testscrp.c

4

```
  deselect_relay(0,0);
  deselect_relay(2,0);
  deselect_relay(4,0);
  deselect_relay(8,0);
  deselect_relay(10,0);
  deselect_relay(12,0);

  deselect_relay(8,1);
  deselect_relay(10,1);
  deselect_relay(12,1);


  return(0);

}


/*
 *
 *
 */
int reset_all_channels()
{
  strobereset(acr);
  strobereset(avr);
  strobereset(bcr);
  strobereset(bvr);
  strobereset(ccr);
  strobereset(cvr);
  strobereset(dcr);
  strobereset(dvr);
  return(0);
}


/*
 *
 *
 */
int reset_wait_for_cycle()
{
  init_flag = 0;
  return(0);
}

/*
 *
```

5 testscrp.c

```
 *
 */
int wait_for_cycle(int cycle_cnt, long begin)
{
  static unsigned int oldinport;
  long end_timer_cnt;
  int current_cnt;
  unsigned int newinport,portbit;

  newinport = getinport();


  if (!init_flag) {
        init_flag = 1;
    oldinport = newinport;
  }

  end_timer_cnt = get_end_timer_cnt(cycle_cnt, begin);

  do {
    current_cnt = (int) ((timer_read() - begin) /TICKSPERCYCLE);

    if((newinport = getinport()) != oldinport) {
          if((portbit = (oldinport ^ newinport)) < 0xff) {
        control_cycle[control_index] = current_cnt;
        switch(portbit) {
          case 0x1:
                control_channel[control_index] = 1;
                break;
          case 0x2:
            control_channel[control_index] = 2;
            break;
          case 0x4:
                control_channel[control_index] = 3;
                break;
          case 0x8:
            control_channel[control_index] = 4;
            break;
          case 0x10:
            control_channel[control_index] = 5;
            break;
          case 0x20:
            control_channel[control_index] = 6;
                break;
          case 0x40:
            control_channel[control_index] = 7;
            break;
```

testscrp.c

```
          case 0x80:
                control_channel[control_index] = 8;
            break;
          default:
            putchar('*');
            break;
        }

        if(portbit & newinport)
          control_data[control_index] = 0;
        else
          control_data[control_index] = 1;

        control_index++;
        /*printf("Control Tester %x at Cycle %d\n",(oldinport ^ newinport), current_cnt);*/
      } else
        if ((portbit & 0x4000)) {
          setup();
          printf("Aborting Script - User Reset\n");
          delay(1000);
          return(1);
        }
      oldinport = newinport;
    }
  } while (timer_read() < end_timer_cnt);
/*  } while (current_cnt < cycle_cnt);*/
  return(0);
}

/*
 *
 *
 */
int get_cycle_cnt(long begin)
{
  return((int)((timer_read() - begin) /TICKSPERCYCLE));
}

/*
 *
 *
 */
long get_end_timer_cnt(int end_cnt, long begin)
{
  return(begin +  (end_cnt * TICKSPERCYCLE));
}
```

```
/*
 *
 *
 */
int initialize_script()
{
  int counter;

  counter = 0;
  Repeat = 1;

  while(event_cycle[counter] != 0) {
        event_cycle[counter] = 0;
        event_type[counter] = 0;
    event_data[counter] = 0;
    counter++;
  }

  counter = 0;

  while(control_cycle[counter] != 0) {
    control_data[counter] = 0;
    counter++;
  }

  return(0);
}

/*
 *
 *
 */
int initialize_control_tester()
{
  int counter;

  counter = 0;

  while(control_cycle[counter] != 0) {
    control_data[counter] = 0;
    counter++;
  }

  return(0);
}
```

testscrp.c

```
/*
 *
 *
 */
int write_log_file(char *filename,char *scriptfilename,char *headerinfo,int destination)
{
  int event_index, channeltype;
  FILE *logfile, *where;
  double amplitude;
  struct  time t;
  struct date d;
  int linecounter = 0;


  control_index = event_index = 0;


  if ((logfile  = fopen(filename,"a")) == NULL) {
    printf("error opening %s \n",filename);
    delay(1000);
    return(0);
  }

  if (destination == DISKFILE)
        where = logfile;
  else
    where = stdout;

  fprintf(where,"\nFile: %s\n",filename);
  fprintf(where,"Script: %s\n",scriptfilename);
  fprintf(where,"Header Info: %s\n",headerinfo);

  gettime(&t);
  fprintf(where,"Time: %2d:%02d:%02d.%02d\n",t.ti_hour, t.ti_min, t.ti_sec, t.ti_hund);

  getdate(&d);
  fprintf(where,"Date: %d/%d/%d\n", d.da_mon,d.da_day,d.da_year);

  fprintf(where,"\n\nCYCLE\tCHANNEL\tTYPE\tDATA\n");
  fprintf(where,"-------\t-------\t-------\t-------\n");

  linecounter = 5;

  while(event_cycle[event_index]) {
        if (destination == SCREEN) {
      if(linecounter > 15) {
        printf("Press <CR> to Continue\n");
```

[redacted]

testscrp.c

9

```
    if (kbhit())
      getch();
    get_answer();
    linecounter=0;
  } else
    linecounter++;
  delay(100);
}
fprintf(where,"%d\t",event_cycle[event_index]);

switch((event_type[event_index] & POLE_MASK) >> 4) {
  case POLE_AC:
    fprintf(where,"AC\t");
    channeltype = 0;
    break;

  case POLE_AV:
    fprintf(where,"AV\t");
    channeltype = 1;
    break;

    case POLE_BC:
    fprintf(where,"BC\t");
    channeltype = 0;
    break;

  case POLE_BV:
    fprintf(where,"BV\t");
    channeltype = 1;
    break;

  case POLE_CC:
    fprintf(where,"CC\t");
    channeltype = 0;
    break;

  case POLE_CV:
    fprintf(where,"CV\t");
    channeltype = 1;
    break;

    case POLE_DC:
    fprintf(where,"DC\t");
    channeltype = 0;
    break;

  case POLE_DV:
```

A000059

```
fprintf(where,"DV\t");
channeltype = 1;
break;

case ST:
fprintf(where,"ST\t");
break;

  case DA:
fprintf(where,"DA\t");
break;

  case GN:
fprintf(where,"GN\t");
break;

  case SV:
fprintf(where,"SV\t");
break;
}

switch((event_type[event_index] & POLE_MASK) >> 4) {

  case POLE_AC:
case POLE_AV:
  case POLE_BC:
  case POLE_BV:
  case POLE_CC:
  case POLE_CV:
  case POLE_DC:
  case POLE_DV:
switch((event_type[event_index] & TYPE_MASK)) {

  case PHASE_EVENT:
        fprintf(where,"PH\t%f\n",event_data[event_index]);
        break;

  case AMPLITUDE_EVENT:
        fprintf(where,"AM\t%f\n",event_data[event_index]);
    if (channeltype) {
      amplitude = event_data[event_index]/Voltage_Gain;
    } else {
      amplitude = event_data[event_index]/Current_Gain;
        }

        amplitude = amplitude / 0.707;
    if (amplitude >1.0) {
```

```
      amplitude = 1.0;
        }
    break;

  case FREQUENCY0_EVENT:
    fprintf(where,"FR\t%f\n",event_data[event_index]);
        break;

  case FREQUENCY1_EVENT:
    fprintf(where,"FR\t%f\n",event_data[event_index]);
    break;
}
break;

case ST:
  fprintf(where,"%u\t%f\n",(event_type[event_index] & TYPE_MASK),event_data[event_index]);
  break;

case DA:
  fprintf(where,"DA\t%f\n",event_data[event_index]);
  break;

case SV:
  fprintf(where,"SV\t%f\n",event_data[event_index]);
  break;

case GN:
  switch((event_type[event_index] & TYPE_MASK)) {

        case VOLTAGE_GAIN_EVENT:
          if(event_data[event_index] > 25)
        event_data[event_index] = 25;
          fprintf(where,"VG\t%f\n",event_data[event_index]);
          Voltage_Gain = event_data[event_index];
          break;

        case CURRENT_GAIN_EVENT:
          if(event_data[event_index] > 25)
        event_data[event_index] = 25;
          fprintf(where,"CG\t%f\n",event_data[event_index]);
          Current_Gain = event_data[event_index];
          break;
  }
  break;
  }

while((control_cycle[control_index] < event_cycle[event_index+1]) && (control_cycle[control_index] >= event_cycle[eve
```

A000061

[redacted]

```
nt_index])) {
          fprintf(where,"%d\tCT\t%x\t%d\n",control_cycle[control_index],control_channel[control_index],control_data[control_i
ndex]);
          control_index++;
        }
        event_index++;
  }

  if (destination == SCREEN) {
        printf("Done Displaying Log - Press <CR> to Continue\n");
        if (kbhit())
        getch();
        get_answer();
  }
  fclose(logfile);

  return(0);
}

/*
 *
 *
 * This function will read script data from the disk drive
 *
 *
 */
int read_script(char *filename, int trace_enable)
{
  FILE *scriptfile;
  char scriptline[100];
  char tempstring[100];
  char del[100] = ":; , ";
  char *channelstring;
  char *typestring;
  char *datastring;
  char *cyclestring;
  char *stringindex;
  int   eventindex;
  int linestatus;
  int linecounter;
  int errorcounter = 0;
  int commentline;
  char trace;
  int repeat_temp;

  int   count;
  unsigned char channel;
```

13 testscrp.c

```
unsigned char type;
double data;

initialize_script();

commentline = 0;
eventindex = 0;
linestatus = 0;
linecounter = 0;
trace = 0;
Current_Type = VOLTAGE_OUTPUT;
set_current_type(VOLTAGE_OUTPUT);


if ((scriptfile  = fopen(filename,"r")) == NULL) {
      printf("error opening %s \n",filename);
      delay(1000);
      return(0);
} else  {
  printf("Reading Script %s\n",filename);
      if (trace_enable) {
        printf("Trace Read (Y/N) ->");
    while (!(trace == 'Y') && !(trace == 'N'))
      trace = toupper(get_answer());
    printf("\n");
    if (trace == 'Y')
      trace = 1;
    else
      trace = 0;
  }

      while(!feof(scriptfile)) {
        errorcounter = 0;
    while(scriptline[errorcounter] != 0) {
      scriptline[errorcounter++] = 0;
        }
        fgets(scriptline,100,scriptfile);

        if ((scriptline != NULL) && isprint(scriptline[0])) {
      errorcounter = 0;
      if (((scriptline[0] == 47) && (scriptline[1] == '*')) || (scriptline[0] == '#')) {
        if(scriptline[0] == '#') {
              commentline = 1;
              strcpy(tempstring,scriptline);
              strupr(tempstring);

              if (strstr(tempstring,"REPEAT")) {
```

A000063

14 testscrp.c

```
            stringindex = (char*)strchr(tempstring,':');
            stringindex++;
            repeat_temp = atoi(stringindex);
            if (repeat_temp>=0)
          Repeat = repeat_temp;
            printf("Repeat = %d\n",Repeat);
         }
         if (strstr(tempstring,"AMPLITUDE")) {
           if (strstr(tempstring,"PEAK")) {
         Amplitude_Type = PEAK_AMP_MODE;
         printf("Amplitude = Peak\n");
           }
           if (strstr(tempstring,"RMS")) {
         Amplitude_Type = RMS_AMP_MODE;
         printf("Amplitude = RMS\n");
           }
         }
         if (strstr(tempstring,"PHASE")) {
           if (strstr(tempstring,"ABS")) {
         Phase_Type = ABS_PHASE_MODE;
         printf("Phase = Absolute\n");
           }
           if (strstr(tempstring,"REL")) {
         Phase_Type = REL_PHASE_MODE;
         printf("Phase = Relative\n");
           }
         }
         if (strstr(tempstring,"CURRENT")) {
           if (strstr(tempstring,"AMPS")) {
                 set_current_type(AMP_OUTPUT);
                 Current_Type = AMP_OUTPUT;
                 printf("Current Output Type  = AMPS\n");
           }
           if (strstr(tempstring,"VOLTS")) {
                 set_current_type(VOLTAGE_OUTPUT);
                 Current_Type = VOLTAGE_OUTPUT;
                 printf("Current Output Type = Volts\n");
           }
         }
   } else
         commentline = 1;
 } else {
   cyclestring = strtok(scriptline, del);

   if (cyclestring) {
         count = atoi(cyclestring);
   } else
```

A000064

15 testscrp.c

```
      linestatus = 1;

channelstring = strtok(NULL, del);

if (channelstring) {
  if (!strcmp(channelstring,"AC"))
    channel = POLE_AC;
      else
        if (!strcmp(channelstring,"AV"))
      channel = POLE_AV;
    else
      if (!strcmp(channelstring,"BC"))
        channel = POLE_BC;
      else
        if (!strcmp(channelstring,"BV"))
              channel = POLE_BV;
        else
              if (!strcmp(channelstring,"CC"))
                channel = POLE_CC;
              else
                if (!strcmp(channelstring,"CV"))
              channel = POLE_CV;
                else
              if (!strcmp(channelstring,"DC"))
                channel = POLE_DC;
              else
                if (!strcmp(channelstring,"DV"))
                      channel = POLE_DV;
                else
                      if (!strcmp(channelstring,"DA"))
                        channel = DA;
                      else
                        if (!strcmp(channelstring,"ST"))
                      channel = ST;
                        else
                      if (!strcmp(channelstring,"GN"))
                        channel = GN;
                      else
                        if (!strcmp(channelstring,"RS"))
                              channel = RS;
                              else
                                if (!strcmp(channelstring,"SV"))
                                      channel = SV;
                                else
                                      linestatus = 2;
}
```

testscrp.c

```
typestring = strtok(NULL, del);

if (typestring) {
      if (!strcmp(typestring,"PH"))
        type = PHASE_EVENT;
      else
        if (!strcmp(typestring,"AM"))
      type = AMPLITUDE_EVENT;
        else
      if (!strcmp(typestring,"FR"))
        type = FREQUENCY0_EVENT;
      else
        if (!strcmp(typestring,"VG"))
              type = VOLTAGE_GAIN_EVENT;
        else
              if (!strcmp(typestring,"CG"))
                type = CURRENT_GAIN_EVENT;
              else
                if (isdigit(typestring[0]))
                      type = atoi(typestring);
                else
                      linestatus = 3;
}

datastring  = strtok(NULL, del);

if (datastring)   {
      data = atof(datastring);
}
else
      linestatus = 4;
  }
}
else
  linestatus = 5;

if (linestatus) {
  if (linestatus == 5)
   printf(" Blank line at Line %d in script %s\n", linecounter+1,filename);
  else
   printf(" Error %d at Line %d in script %s\n",linestatus, linecounter+1,filename);
  break;
} else {
  event_cycle[eventindex] = count;
  event_type[eventindex] = (channel<<4) + type;
  event_data[eventindex] = data;
```

testscrp.c 17

```
        if (!commentline) {
          eventindex++;
          linecounter++;
        }
        if (trace)
            if (commentline) {
               commentline = 0;
               printf("%s",scriptline);
            }
               else
             printf(" Line = %d cycle = %d type = %x data = %f\n",linecounter+1, event_cycle[eventindex-1],event_type[eventi
ndex-1], event_data[eventindex-1]);

      }
        }
  }
  fclose(scriptfile);

  if (trace)
    {
    printf("\nDone Reading Script - Press Any Key to Continue\n");
    getchar();
    }

  return(1);
}


/*
 *
 *
 */
int execute_script(int trace_enable)
{
  long begin;
  int event_index;
  int repeat_counter;
  unsigned char far *ddsaddress;
  unsigned char far *cregaddress;
  char trace, channeltype;
  double amplitude, gain, phase;

  trace = 0;
  repeat_counter = control_index = event_index = 0;
  if (trace_enable) {
        printf("Trace Execution - Tracing Will Degrade Timing Accuracy (Y/N) ->");
    while (!(trace == 'Y') && !(trace == 'N'))
```

testscrp.c

```
    trace = toupper(get_answer());
  printf("\n");
  if (trace == 'Y')
    trace = 1;
  else
    trace = 0;
}

repeat_counter = 0;

do {
      control_index = event_index = 0;

  reset_wait_for_cycle();

  begin = timer_read();

  initialize_control_tester();

  while(event_cycle[event_index]) {
    if (wait_for_cycle(event_cycle[event_index],begin))
      return(1);

    if (trace)
      printf(" Cycle = %d ",event_cycle[event_index]);

    switch((event_type[event_index] & POLE_MASK) >> 4) {
      case POLE_AC:
        if (trace)
          printf("CHANNEL = AC ");
        channeltype = 0;
        ddsaddress = accs;
        cregaddress = acr;
        break;

      case POLE_AV:
        if (trace)
          printf("CHANNEL = AV ");
        channeltype = 1;
        ddsaddress = avcs;
        cregaddress = avr;
        break;

      case POLE_BC:
       if (trace)
         printf("CHANNEL = BC ");
       channeltype = 0;
```

A000068

[redacted]

testscrp.c

19

```
ddsaddress = bccs;
cregaddress = bcr;
break;

case POLE_BV:
  if (trace)
    printf("CHANNEL = BV ");
  channeltype = 1;
  ddsaddress = bvcs;
  cregaddress = bvr;
  break;

case POLE_CC:
  if (trace)
    printf("CHANNEL = CC ");
  channeltype = 0;
  ddsaddress = cccs;
  cregaddress = ccr;
  break;

case POLE_CV:
  if (trace)
    printf("CHANNEL = CV ");
  channeltype = 1;
  ddsaddress = cvcs;
  cregaddress = cvr;
  break;

case POLE_DC:
  if (trace)
    printf("CHANNEL = DC ");
  ddsaddress = dccs;
  cregaddress = dcr;
  break;

case POLE_DV:
  if (trace)
    printf("CHANNEL = DV ");
  ddsaddress = dvcs;
  cregaddress = dvr;
  break;

case ST:
  if (trace)
        printf("CHANNEL = ST ");
  break;
```

A000069 testscrp.c

20

```
case DA:
  if (trace)
    printf("CHANNEL = DA ");
  break;

case GN:
  if (trace)
    printf("CHANNEL = GN ");
  break;

case RS:
  if (trace)
        printf("CHANNEL = RS ");
  break;

case SV:
  if (trace)
        printf("CHANNEL = SV ");
  break;
  }

switch((event_type[event_index] & POLE_MASK) >> 4) {

 case POLE_AC:
 case POLE_AV:
 case POLE_BC:
 case POLE_BV:
 case POLE_CC:
 case POLE_CV:
 case POLE_DC:
 case POLE_DV:
   switch((event_type[event_index] & TYPE_MASK)) {
     case PHASE_EVENT:
           switch(get_channel_offset(ddsaddress)) {
         case  AVR_OFFSET:
         case  BVR_OFFSET:
         case  CVR_OFFSET:
         case  DVR_OFFSET:

           break;
         case  ACR_OFFSET:
         case  BCR_OFFSET:
         case  CCR_OFFSET:
         case  DCR_OFFSET:
         default:
           break;
       }
```

A000070

```
  if (channeltype) {
    phase = event_data[event_index];
  } else {
    phase = event_data[event_index];
  }

  if(Phase_Type == ABS_PHASE_MODE) {
    if (trace)
      printf("Type = Absolute PHASE Data = %f \n",event_data[event_index]);
    phase = phase;  /* No change */
  } else
    if (Phase_Type == REL_PHASE_MODE) {
      if (trace)
        printf("Type = Relative PHASE Data = %f \n",event_data[event_index]);
      phase = phase;   /* convert to ABSOLUTE */
    }

  setphase(event_data[event_index],ddsaddress,cregaddress);
  break;

case AMPLITUDE_EVENT:

  if (channeltype) {
    amplitude = event_data[event_index]/Voltage_Gain;
  } else {
    amplitude = event_data[event_index]/Current_Gain;
  }

  if(Amplitude_Type == RMS_AMP_MODE) {
    if (trace)
      printf("Type = RMS AMPLITUDE Data = %f \n",event_data[event_index]);
    amplitude = amplitude;  /* 1.0 DA scaled to 1.0 RMS values by gain Stage */
  } else
    if (Amplitude_Type == PEAK_AMP_MODE) {

      if (trace)
            printf("Type = PEAK AMPLITUDE Data = %f \n",event_data[event_index]);
      amplitude = amplitude *.707;  /* convert to RMS */
    }


  if (amplitude >1.0) {
    amplitude = 1.0;
  }
  setamplitude(0.0,amplitude,ddsaddress,cregaddress);
      break;
```

testscrp.c

```
    case FREQUENCY0_EVENT:
      if (trace)
        printf("Type = FREQUENCY0 Data = %f \n",event_data[event_index]);
      setfreq0(event_data[event_index],ddsaddress,cregaddress);
      break;

    case FREQUENCY1_EVENT:
      if (trace)
        printf("Type = FREQUENCNCY1 Data = %f \n",event_data[event_index]);
          setfreq1(event_data[event_index],ddsaddress,cregaddress);
      break;
  }
  break;

case ST:
  if (trace)
    printf("Bit = %x Data = %f \n",(event_type[event_index] & TYPE_MASK),event_data[event_index]);
  setoutportbit((event_type[event_index] & TYPE_MASK),(int) event_data[event_index]);
  break;

case DA:
  if (trace)
        printf("Type = DA Data = %f \n",event_data[event_index]);
  write_to_dac((event_data[event_index]/25*0x3fff), 6, 0);
  break;

case SV:
  if (trace)
        printf("Type = SV Data = %f \n",event_data[event_index]);
  setvariac((event_data[event_index]/132)*0x3fff);
  break;

case RS:
  setup();
  break;

case GN:
  switch((event_type[event_index] & TYPE_MASK)) {
        case VOLTAGE_GAIN_EVENT:
      if (trace)
        printf("Type = VG Data = %f \n",event_data[event_index]);
      gain = event_data[event_index];

          if(gain> 18.0)
        gain = 18.0;
```

23 testscrp.c

```
/*                  set_v_gain(voltage_gain_table[gain],VOLTAGE_GAIN_EVENT);*/
                    set_vfsg(gain,VOLTAGE_GAIN_EVENT);
                    Voltage_Gain = event_data[event_index];
                    break;
                  case CURRENT_GAIN_EVENT:
                    if (trace)
                  printf("Type = CG Data = %f \n",event_data[event_index]);
                    gain = event_data[event_index];
                    if(gain> 18.0)
                  gain = 18.0;
                    if (Current_Type == AMP_OUTPUT)
                          set_cfsg(gain,CURRENT_GAIN_EVENT);
/*                        set_c_gain(current_gain_table[gain],CURRENT_GAIN_EVENT);   */
                    if (Current_Type == VOLTAGE_OUTPUT)
                          set_vfsg(gain,CURRENT_GAIN_EVENT);
/*                        set_v_gain(voltage_gain_table[gain],CURRENT_GAIN_EVENT);*/
                    Current_Gain = event_data[event_index];
                    break;
          }
        break;
          }
        event_index++;
    }
  } while(++repeat_counter < Repeat);

  makebeep(300,1000);

  if(trace) {
  printf("\nDone Executing Script - Press Any Key to Continue\n");
  getchar();
  }
  return 0;
}


/*
 *
 *
 */
setup()
{
init(0xd000);
set_clock_freq(50000000.0);

set_vfsg(0.0,VOLTAGE_GAIN_EVENT);
/*set_v_gain(voltage_gain_table[0],VOLTAGE_GAIN_EVENT);*/
Voltage_Gain = 1.0;
```

A000073

```
set_vfsg(0.0,CURRENT_GAIN_EVENT);
set_cfsg(0.0,CURRENT_GAIN_EVENT);
/*set_v_gain(voltage_gain_table[0],CURRENT_GAIN_EVENT);
set_c_gain(current_gain_table[0],CURRENT_GAIN_EVENT);*/
Current_Gain = 1.0;

/* set channel ac */
selectfreq(1,acr);
selectsleep(0,acr);
setcontrol(BUS8|NORMAL|AMPMOD|CLKSYNCH,accs,acr);
setfreq0(60,accs,acr);
setamplitude(0.0,0.0,accs,acr);
setphase(0,accs,acr);

/* set channel av */
selectfreq(1,avr);
selectsleep(0,avr);
setcontrol(BUS8|NORMAL|AMPMOD|CLKSYNCH,avcs,avr);
setfreq0(60,avcs,avr);
setamplitude(0.0,0.0,avcs,avr);
setphase(0,avcs,avr);

/* set channel bc */
selectfreq(1,bcr);
selectsleep(0,bcr);
setcontrol(BUS8|NORMAL|AMPMOD|CLKSYNCH,bccs,bcr);
setfreq0(60,bccs,bcr);
setamplitude(0.0,0.0,bccs,bcr);
setphase(0,bccs,bcr);

/* set channel bv */
selectfreq(1,bvr);
selectsleep(0,bvr);
setcontrol(BUS8|NORMAL|AMPMOD|CLKSYNCH,bvcs,bvr);
setfreq0(60,bvcs,bvr);
setamplitude(0.0,0.0,bvcs,bvr);
setphase(0,bvcs,bvr);

/* set channel cc */
selectfreq(1,ccr);
selectsleep(0,ccr);
setcontrol(BUS8|NORMAL|AMPMOD|CLKSYNCH,cccs,ccr);
setfreq0(60,cccs,ccr);
setamplitude(0.0,0.0,cccs,ccr);
setphase(0,cccs,ccr);
```

[redacted]

testscrp.c

25

```
/* set channel cv */
selectfreq(1,cvr);
selectsleep(0,cvr);
setcontrol(BUS8|NORMAL|AMPMOD|CLKSYNCH,cvcs,cvr);
setfreq0(60,cvcs,cvr);
setamplitude(0.0,0.0,cvcs,cvr);
setphase(0,cvcs,cvr);


/* set channel dc */
selectfreq(1,dcr);
selectsleep(0,dcr);
setcontrol(BUS8|NORMAL|AMPMOD|CLKSYNCH,dccs,dcr);
setfreq0(60,dccs,dcr);
setamplitude(0.0,0.0,dccs,dcr);
setphase(0,dccs,dcr);


/* set channel dv */
selectfreq(1,dvr);
selectsleep(0,dvr);
setcontrol(BUS8|NORMAL|AMPMOD|CLKSYNCH,dvcs,dvr);
setfreq0(60,dvcs,dvr);
setamplitude(0.0,0.0,dvcs,dvr);
setphase(0,dvcs,dvr);

/* set freq 0 as active frequency  to synchronize signals */
selectfreq(0,avr);
selectfreq(0,acr);
selectfreq(0,bcr);
selectfreq(0,bvr);
selectfreq(0,ccr);
selectfreq(0,cvr);
selectfreq(0,dvr);
selectfreq(0,dcr);


return(0);
}


/*
 *
 *
 */
reset_active_channel()
{
```

26 testscrp.c

```
switch(get_current_channel_offset()) {
  case  AVR_OFFSET:
        /* set channel av */
        selectsleep(0,avr);
    setcontrol(BUS8|NORMAL|AMPMOD|CLKSYNCH,avcs,avr);
    setfreq0(60,avcs,avr);
        setamplitude(0.0,0.0,avcs,avr);
    setphase(0,avcs,avr);
        break;
  case  ACR_OFFSET:
    /* set channel ac */
    selectsleep(0,acr);
    setcontrol(BUS8|NORMAL|AMPMOD|CLKSYNCH,accs,acr);
    setfreq0(60,accs,acr);
        setamplitude(0.0,0.0,accs,acr);
    setphase(0,accs,acr);
    break;
  case  BVR_OFFSET:
    /* set channel bv */
        selectsleep(0,bvr);
        setcontrol(BUS8|NORMAL|AMPMOD|CLKSYNCH,bvcs,bvr);
    setfreq0(60,bvcs,bvr);
        setamplitude(0.0,0.0,bvcs,bvr);
        setphase(0,bvcs,bvr);
    break;
  case  BCR_OFFSET:
    /* set channel bc */
    selectsleep(0,bcr);
        setcontrol(BUS8|NORMAL|AMPMOD|CLKSYNCH,bccs,bcr);
    setfreq0(60,bccs,bcr);
    setamplitude(0.0,0.0,bccs,bcr);
    setphase(0,bccs,bcr);
    break;
  case  CVR_OFFSET:
        /* set channel cv */
    selectsleep(0,cvr);
    setcontrol(BUS8|NORMAL|AMPMOD|CLKSYNCH,cvcs,cvr);
    setfreq0(60,cvcs,cvr);
    setamplitude(0.0,0.0,cvcs,cvr);
        setphase(0,cvcs,cvr);
        break;
  case  CCR_OFFSET:
        /* set channel cc */
        selectsleep(0,ccr);
    setcontrol(BUS8|NORMAL|AMPMOD|CLKSYNCH,cccs,ccr);
    setfreq0(60,cccs,ccr);
    setamplitude(0.0,0.0,cccs,ccr);
```

27 testscrp.c

```
      setphase(0,cccs,ccr);
          break;
    case  DVR_OFFSET:
      /* set channel dv */
      selectsleep(0,dvr);
      setcontrol(BUS8|NORMAL|AMPMOD|CLKSYNCH,dvcs,dvr);
      setfreq0(60,dvcs,dvr);
          setamplitude(0.0,0.0,dvcs,dvr);
      setphase(0,dvcs,dvr);
      break;
    case  DCR_OFFSET:
      /* set channel dc */
          selectsleep(0,dcr);
          setcontrol(BUS8|NORMAL|AMPMOD|CLKSYNCH,dccs,dcr);
      setfreq0(60,dccs,dcr);
          setamplitude(0.0,0.0,dccs,dcr);
          setphase(0,dccs,dcr);
      break;
    default:
      printf(" NO Channel Set!\n");
          delay(1000);
          break;
  }
  return(0);
}

/*
 *
 *
 */
signal_close()
{

set_vfsg(0.0,VOLTAGE_GAIN_EVENT);
/*set_v_gain(voltage_gain_table[0],VOLTAGE_GAIN_EVENT);*/
Voltage_Gain = 1.0;

set_vfsg(0.0,CURRENT_GAIN_EVENT);
set_cfsg(0.0,CURRENT_GAIN_EVENT);
Current_Gain = 1.0;

/*  set_vfsg(voltage_gain_table[0],VOLTAGE_GAIN_EVENT);
  Voltage_Gain = 1.0;

  set_v_gain(voltage_gain_table[0],CURRENT_GAIN_EVENT);
  set_c_gain(current_gain_table[0],CURRENT_GAIN_EVENT);
  Current_Gain = 1.0;
```

A000077 testscrp.c

28

```
*/
  /* set channel ac */
  selectfreq(1,acr);
  selectsleep(0,acr);
  setcontrol(BUS8|NORMAL|AMPMOD|CLKSYNCH,accs,acr);
  setfreq0(60,accs,acr);
  setamplitude(0.0,0.0,accs,acr);
  setphase(0,accs,acr);

  /* set channel av */
  selectfreq(1,avr);
  selectsleep(0,avr);
  setcontrol(BUS8|NORMAL|AMPMOD|CLKSYNCH,avcs,avr);
  setfreq0(60,avcs,avr);
  setamplitude(0.0,0.0,avcs,avr);
  setphase(0,avcs,avr);

  /* set channel bc */
  selectfreq(1,bcr);
  selectsleep(0,bcr);
  setcontrol(BUS8|NORMAL|AMPMOD|CLKSYNCH,bccs,bcr);
  setfreq0(60,bccs,bcr);
  setamplitude(0.0,0.0,bccs,bcr);
  setphase(0,bccs,bcr);

  /* set channel bv */
  selectfreq(1,bvr);
  selectsleep(0,bvr);
  setcontrol(BUS8|NORMAL|AMPMOD|CLKSYNCH,bvcs,bvr);
  setfreq0(60,bvcs,bvr);
  setamplitude(0.0,0.0,bvcs,bvr);
  setphase(0,bvcs,bvr);

  /* set channel cc */
  selectfreq(1,ccr);
  selectsleep(0,ccr);
  setcontrol(BUS8|NORMAL|AMPMOD|CLKSYNCH,cccs,ccr);
  setfreq0(60,cccs,ccr);
  setamplitude(0.0,0.0,cccs,ccr);
  setphase(0,cccs,ccr);

  /* set channel cv */
  selectfreq(1,cvr);
  selectsleep(0,cvr);
  setcontrol(BUS8|NORMAL|AMPMOD|CLKSYNCH,cvcs,cvr);
  setfreq0(60,cvcs,cvr);
  setamplitude(0.0,0.0,cvcs,cvr);
```

```
  setphase(0,cvcs,cvr);


  /* set channel dc */
  selectfreq(1,dcr);
  selectsleep(0,dcr);
  setcontrol(BUS8|NORMAL|AMPMOD|CLKSYNCH,dccs,dcr);
  setfreq0(60,dccs,dcr);
  setamplitude(0.0,0.0,dccs,dcr);
  setphase(0,dccs,dcr);


  /* set channel dv */
  selectfreq(1,dvr);
  selectsleep(0,dvr);
  setcontrol(BUS8|NORMAL|AMPMOD|CLKSYNCH,dvcs,dvr);
  setfreq0(60,dvcs,dvr);
  setamplitude(0.0,0.0,dvcs,dvr);
  setphase(0,dvcs,dvr);

  setvariac(0);


  return(0);
}

/****************************************************************
****************************************************************

****************************************************************
***************************************************************/
int get_answer()
{
  int answer, dummy;

  while(!kbhit())
    { ; }

  answer = toupper(getch());
  delay(100);
  while(kbhit()) {
        dummy = getch();
    dummy = dummy;
  }

  return(answer);
}
```

testscrp.c

```
/*********************************************************************
**********************************************************************
  This function will set up the address and call the init function
**********************************************************************
*********************************************************************/
int address_init()
{
  unsigned char answer = 0;

  display_address_menu();
  while(answer != 27) {
    answer = get_answer();
    switch(toupper(answer)) {
          case '1':
        init(0xb000);
        answer = 27;
        break;
      case '2':
        init(0xb800);
        answer = 27;
        break;
          case '3':
        init(0xc000);
        answer = 27;
        break;
      case '4':
        init(0xc800);
        answer = 27;
        break;
      case '5':
        init(0xd000);
        answer = 27;
        break;
          case '6':
        init(0xd800);
        answer = 27;
        break;
      case '7':
        init(0xe000);
        answer = 27;
        break;
          case '8':
        init(0xe800);
        answer = 27;
        break;
      case '9':
```

[redacted]

31

```
        init(0xf000);
        answer = 27;
        break;
      case 'A':
        init(0xf800);
        answer = 27;
        break;
          case 13:
        init(0xd000);
        answer = 27;
        break;

      default:
        init(0xd000);
        answer = 27;
        break;

    }
  }

  return(0);
}

/************************************************************************
*************************************************************************
  This function will set up the address and call the init function
*************************************************************************
************************************************************************/
int main_menu()
{
  char scriptfilename[100];
  char logfilename[100];
  char basefilename[100];
  char *logptr;
  char headerinfoline[255];
  unsigned char answer = 0;
  int script_active = 0;
  int execute_active = 0;
/*  int getserror;*/
  display_main_menu();

  while(answer != 'Q') {

    if (getinportbit(0xf) == 0) {     /* run switch */
          putchar(12); clrscr();
      if (!script_active)
        script_active = read_script("default.scr",0);
```

A000081

32 testscrp.c

```
      if (script_active) {
    printf("RUN - Executing Script\n\n");
    execute_script(0);
      }
  display_main_menu();
  delay(500);
}

    if (getinportbit(0xe) == 0) { /*reset switch */
  printf("RESETING\n");
  delay(500);
      display_main_menu();
  setup();
}

if(kbhit()) {
  answer = get_answer();
      switch(answer) {
    case '1':
      initialize_script();
      execute_active = 0;
      script_active = 0;
      break;

    case '2':
      setup();
      break;

    case '3':
      /*read_menu();*/
      putchar(12); clrscr();
      printf("\n\n\nEnter filename for script -> ");
      gets(scriptfilename);
      if(!check_filename_ext(scriptfilename))
        append_filename_ext(scriptfilename,".scr");
      printf("\n");
      script_active = read_script(scriptfilename,1);
      display_main_menu();
      break;
    case '4':
      putchar(12); clrscr();
      printf("Executing Script %s\n\n",scriptfilename);
      if (!script_active)
            script_active = read_script("default.scr",1);
      if (script_active) {
        execute_script(1);
        execute_active = 1;
```

A000082

[redacted]

testscrp.c

33

```
}
display_main_menu();
/*execute_menu();*/
break;
case '5':
control_menu();
break;
case '6':
putchar(12); clrscr();
if (execute_active) {
      get_filename_base(scriptfilename,basefilename);
  append_filename_ext(basefilename,".log");
  printf("\n\n\nEnter filename for log (%s) -> ",basefilename);
      gets(logfilename);
  if (*logfilename != 0) {
        printf(" %s, v = %x",logfilename,*logfilename);
        logptr = logfilename;
  } else {
    logptr = basefilename;
  }

      printf("\n");
  printf("Enter Header Information (80 chars or less) -> ");
  gets(headerinfoline);
      printf("\n");
  write_log_file(logptr,scriptfilename,headerinfoline,DISKFILE);
} else {
  printf("No Script Executed!\n");
  delay(1000);
}
display_main_menu();
break;
case '7':
putchar(12); clrscr();
if (execute_active) {
  write_log_file("logfile",scriptfilename,"Screen Display",SCREEN);
      display_main_menu();
} else {
  printf("No Script Executed!\n");
  delay(1000);
}
display_main_menu();
break;

case '?':
display_main_menu();
break;
```

testscrp.c

34

```
        default:
          display_main_menu();
          break;
          }
      }
    }
  return(0);
}

/*********************************************************************
*********************************************************************
  This function will set up the address and call the init function
*********************************************************************
*********************************************************************/
int channel_menu()
{

  unsigned char answer = 0;

  display_channel_menu();
  while(answer != 27) {
    answer = get_answer();
    switch(answer) {

      case '1':
        putchar(12); clrscr();
        active_control_channel = avr;
        active_dds_channel = avcs;
        active_channel_number = 3;
        display_channel_menu();
        break;

          case '2':
        putchar(12); clrscr();
        active_control_channel = acr;
        active_dds_channel = accs;
        active_channel_number = 0;
        display_channel_menu();
        break;

          case '3':
        putchar(12); clrscr();
        active_control_channel = bvr;
        active_dds_channel = bvcs;
        active_channel_number = 4;
        display_channel_menu();
        break;
```

[redacted]

testscrp.c

35

```
    case '4':
  putchar(12); clrscr();
  active_control_channel = bcr;
  active_dds_channel = bccs;
  active_channel_number = 1;
  display_channel_menu();
  break;

    case '5':
  putchar(12); clrscr();
  active_control_channel = cvr;
  active_dds_channel = cvcs;
  active_channel_number = 5;
  display_channel_menu();
  break;

    case '6':
  putchar(12); clrscr();
  active_control_channel = ccr;
  active_dds_channel = cccs;
  active_channel_number = 2;
  display_channel_menu();
  break;

    case '7':
  putchar(12); clrscr();
  active_control_channel = dvr;
  active_dds_channel = dvcs;
  active_channel_number = answer;
  display_channel_menu();
  break;

    case '8':
  putchar(12); clrscr();
  active_control_channel = dcr;
  active_dds_channel = dccs;
  active_channel_number = answer;
  display_channel_menu();
  break;
  }
 }
 display_main_menu();
 return(0);
}

/**********************************************************************
```

A000085 testscrp.c

36

```
**********************************************************************
  This function will set up the address and call the init function
**********************************************************************
*********************************************************************/
int control_menu()
{

  unsigned char answer = 0;
  char datastring[30];
  double data,fsg,amplitudepercent;
  int idata;

  channel_menu();
  display_control_menu();
  while(answer != 27) {
        answer = get_answer();
    switch(toupper(answer)) {
          case '1':
        putchar(12); clrscr();
        reset_active_channel();
        display_control_menu();
        break;

          case '2':
        putchar(12); clrscr();
        selectsleep(0,active_control_channel);
        display_control_menu();
        break;

          case '3':
        putchar(12); clrscr();
        selectsleep(1,active_control_channel);
        display_control_menu();
        break;

          case '4':
        putchar(12); clrscr();
        selectfreq(0,active_control_channel);
        display_control_menu();
        break;

          case '5':
        putchar(12); clrscr();
        selectfreq(1,active_control_channel);
        display_control_menu();
        break;
```

A000086 testscrp.c

```
case '6':
  putchar(12); clrscr();
  printf("Enter value for Frequency 0 ->");
  gets(datastring);
  data = 0.0;
  data = atof(datastring);
  setfreq0(data,active_dds_channel,active_control_channel);
  display_control_menu();
  break;

   case '7':
  putchar(12); clrscr();
  printf("Enter value for Frequency 1 ->");
  gets(datastring);
  data = 0.0;
  data = atof(datastring);
  setfreq1(data,active_dds_channel,active_control_channel);
  display_control_menu();
  break;

   case '8':
  putchar(12); clrscr();
  printf("Enter value for Phase ->");
  gets(datastring);
  data = 0.0;
  data = atof(datastring);
  setphase(data,active_dds_channel,active_control_channel);
  display_control_menu();
  break;

   case '9':
  putchar(12); clrscr();
  printf("Enter value for Amplitude ->");
  gets(datastring);
  data = 0.0;
  data = atof(datastring);

  if (Current_Type == AMP_OUTPUT)
    fsg = get_fsg_channel(active_channel_number,1);
  if (Current_Type == VOLTAGE_OUTPUT)
    fsg = get_fsg_channel(active_channel_number,0);

  if (fsg >= 1.0)
    amplitudepercent = data/fsg;
  else
    amplitudepercent = 0;
  //  amplitudepercent = 1.0;
```

A000087 testscrp.c

```
        printf("data = %f percent = %f\n",data,amplitudepercent);
        getchar();
        if (amplitudepercent > 1)
          amplitudepercent = 1.0;


        setamplitude(0.0,amplitudepercent,active_dds_channel,active_control_channel);
        display_control_menu();
        break;

          case 'A':
        putchar(12); clrscr();
        printf("Enter value for Full Scale Voltage -> ");
        gets(datastring);
        data = 0.0;
        data = atof(datastring);
        getchar();
        if(data > 18)
          data = 18;
        printf("data = %f\n",data);
        set_vfsg(data,1);
//      set_v_gain(voltage_gain_table[data],VOLTAGE_GAIN_EVENT);
        Voltage_Gain = data;
        display_control_menu();
        break;

          case 'B':
        putchar(12); clrscr();
        printf("Enter value for Full Scale Current -> ");
        gets(datastring);
        data = 0.0;
        data = atof(datastring);
        getchar();
        if(data > 18)
          data = 18;
        printf("data = %f\n",data);
        if (Current_Type == AMP_OUTPUT)
          set_cfsg(data,0);
//        set_c_gain(current_gain_table[data],CURRENT_GAIN_EVENT);
        if (Current_Type == VOLTAGE_OUTPUT)
          set_vfsg(data,0);
//        set_v_gain(voltage_gain_table[data],VOLTAGE_GAIN_EVENT);
        Current_Gain = data;
        display_control_menu();
        break;
```

[redacted]

testscrp.c

39

```
case 'C':
putchar(12); clrscr();
printf("Enter Status Tester to Close (0-15) ->");
gets(datastring);
idata = 0;
idata = atoi(datastring);
if (idata >=0 && idata <= 15)
  setoutportbit(idata,1);
display_control_menu();
break;

  case 'D':
putchar(12); clrscr();
printf("Enter Status Tester to Open (0-15) ->");
gets(datastring);
idata = 0;
idata = atoi(datastring);
if (idata >=0 && idata <= 15)
  setoutportbit(idata,0);
display_control_menu();
break;

case 'E':
putchar(12); clrscr();
printf("Enter Current Sensor Output Type  1 = Voltage  0 = Current");
gets(datastring);
idata = 16;
idata = atoi(datastring);
if (idata == 1 ){
        set_current_type(VOLTAGE_OUTPUT);
  Current_Type = VOLTAGE_OUTPUT;
}
if (idata == 0 ) {
  set_current_type(AMP_OUTPUT);
  Current_Type = AMP_OUTPUT;
}
display_control_menu();
break;

case 'F':
putchar(12); clrscr();
fsg = get_fsg_channel(active_channel_number,0);
printf("Active channel num = %d\n",active_channel_number);
calibrate_channel_level((int)fsg,active_channel_number,0);
delay(1000);
display_control_menu();
break;
```

```
        case 'G':
        printf("\nComplete Channel Calibration ");
        calibrate_channel(active_channel_number,0,18);
        display_control_menu();
        break;

        case 'H':
        printf("Enter Variac value 0-132 ");
        gets(datastring);
        data = 0.0;
        data = atof(datastring);
        setvariac((data/132)*0x3fff);
        display_control_menu();
        break;

        case 27:
        break;

        default:
        putchar(12); clrscr();
        printf("Invalid Choice");
        delay(1000);
        display_control_menu();
        break;

        }
  }
  display_main_menu();
  return(0);
}

/***********************************************************************
***********************************************************************
        This function will dispaly the header information
***********************************************************************
**********************************************************************/
int display_header()
{
putchar(12); clrscr();
printf("\n\n\n     ******************************************************************\n");
printf("     *                RTU TEST SYSTEM REV 0.991B                   *\n");
printf("     *                COPYRIGHT 1992,93                            *\n");
printf("     *                NOMADIC TECHNOLOGIES INC.                    *\n");
printf("     *                MOUNTAIN VIEW, CALIFORNIA USA                *\n");
printf("     ***************************************************************\n");
```

testscrp.c

```
return(0);
}


/**********************************************************************
**********************************************************************
                  This function will dispaly the menu
**********************************************************************
*********************************************************************/
int display_main_menu()
{

  putchar(12); clrscr();
  display_header();
  printf("\nMENU\n\n");
  printf("1 - Initialize Script\n");
  printf("2 - Reset All Channels\n");
  printf("3 - Read Script from Disk\n");
  printf("4 - Execute Script\n");
  printf("5 - Set Control Parameters for a Channel\n");
  printf("6 - Write Log File\n");
  printf("7 - Display Log File\n");

  printf("Q - Quit this Program\n");
  printf("? - Display This Screen\n");

  return(0);
}
/**********************************************************************
**********************************************************************
                  This function will dispaly the menu
**********************************************************************
*********************************************************************/
int display_address_menu()
{

  putchar(12); clrscr();
  display_header();
  printf("Enter Address at Which RTU TESTER is Located\n");
  printf("Default Factory Setting is 0xD8000 (<cr> uses default)\n\n");
  printf("1 - 0xB0000\n");
  printf("2 - 0xB8000\n");
  printf("3 - 0xC0000\n");
  printf("4 - 0xC8000\n");
  printf("5 - 0xD0000\n");
  printf("6 - 0xD8000\n");
```

A000091

```
  printf("7 - 0xE0000\n");
  printf("8 - 0xE8000\n");
  printf("9 - 0xF0000\n");
  printf("A - 0xF8000\n");

  return(0);
}


/**********************************************************************
***********************************************************************
                 This function will dispaly the menu
***********************************************************************
**********************************************************************/
int display_control_menu()
{

  putchar(12); clrscr();
  display_header();
  display_current_channel();
  printf("\nControl Menu\n");
  printf("1   - Reset Channel\n");
  printf("2   - Set Sleep Mode\n");
  printf("3   - Set Active Mode\n");
  printf("4   - Select Frequency 0\n");
  printf("5   - Select Frequency 1\n");
  printf("6   - Set Frequency 0\n");
  printf("7   - Set Frequency 1\n");
  printf("8   - Set Phase\n");
  printf("9   - Set Amplitude\n");
  printf("A   - Set Voltage Full Scale\n");
  printf("B   - Set Current Full Scale\n");
  printf("C   - Close Status Tester\n");
  printf("D   - Open Status Tester\n");
  printf("E   - Set Current Sensor Output Type\n");
  printf("F   - Auto Calibrate Channel at Single Level\n");
  printf("G   - Auto Calibrate Channel at all levels (SLOW)\n");
  printf("H   - Enter Variac Voltage\n");

  printf("ESC - Go to Last Menu\n");

  return(0);
}

/********************************************************************
**********************************************************************
                 This function will dispaly the menu
```

[redacted]

43 testscrp.c

```
**********************************************************************
*********************************************************************/
int display_sleep_menu()
{

  putchar(12); clrscr();
  display_header();
  display_current_channel();
  printf("\nSleep Menu\n");
  printf("1   - Set Normal Mode for Active Channel\n");
  printf("2   - Set Sleep Mode for Active Channel\n");
  printf("ESC - Go to Last Menu\n");

  return(0);
}

/*********************************************************************
**********************************************************************
                 This function will dispaly the menu
**********************************************************************
*********************************************************************/
int display_channel_menu()
{

  putchar(12); clrscr();
  display_header();
  display_current_channel();
  printf("\nChannel Menu\n");
  printf("1   - AV\n");
  printf("2   - AC\n");
  printf("3   - BV\n");
  printf("4   - BC\n");
  printf("5   - CV\n");
  printf("6   - CC\n");
  printf("7   - DV\n");
  printf("8   - DC\n");
  printf("ESC - Go to Last Menu\n");

  return(0);
}

/*
 *
 * This function will dispaly the menu
 *
 */
int display_current_channel()
```

testscrp.c

44

```
{
  printf("\nCurrent channel = ");
  switch(get_current_channel_offset()) {
        case  AVR_OFFSET:
      printf("AV\n");
      break;
    case  ACR_OFFSET:
      printf("AC\n");
      break;
    case  BVR_OFFSET:
      printf("BV\n");
      break;
    case  BCR_OFFSET:
      printf("BC\n");
      break;
    case  CVR_OFFSET:
      printf("CV\n");
      break;
    case  CCR_OFFSET:
          printf("CC\n");
          break;
    case  DVR_OFFSET:
      printf("DV\n");
          break;
    case  DCR_OFFSET:
      printf("DC\n");
      break;
    default:
      printf(" NO Channel Set!\n");
      break;
  }
  return(0);
}

/*
 * This function will return the active menu offset
 *
 */
unsigned int get_current_channel_offset()
{

  return(get_channel_offset(active_control_channel));
}

/***********************************************************************
************************************************************************
```

[redacted]

45 testscrp.c

```
***********************************************************************
**********************************************************************/
char * get_delimiter_pos(char *datastring, char delimiter)
{
  char *ptr;

  ptr = (char*)strchr(datastring,delimiter);
  ptr++;
  return(ptr);
}

/**********************************************************************
***********************************************************************

***********************************************************************
**********************************************************************/
int check_filename_ext(char *filename)
{
  char *per;
  per = (char*)strchr(filename,'.');
  if (per == NULL)
    return(0);
  else
    return(1);
}

/**********************************************************************
***********************************************************************

***********************************************************************
**********************************************************************/
int get_filename_base(char *filename, char *base)
{
  char *per;

/*  printf(" base = %s\n", base);*/
  strcpy(base, filename);
  per = (char*)strchr(base,'.');
  if (per == NULL)
        return(1);
  else {
        *per = 0;
/*    printf(" base = %s\n", base);*/
    return(0);
  }
}
```

A000095 testscrp.c

```
/***********************************************************************
************************************************************************

************************************************************************
***********************************************************************/
int append_filename_ext(char *filename, char *ext)
{
  strcat(filename,ext);
/*  printf(" filename = %s\n", filename);*/
  return(0);
}


/*
 *
 *
 */
int makebeep(int tone,int duration)
{

  duration = duration / 6;

  sound(tone);
  delay(duration);
  sound(tone*2);
  delay(duration);
  sound(tone);
  delay(duration);
  sound(tone*2);
  delay(duration);
  sound(tone);
  delay(duration);
  sound(tone*2);
  delay(duration);
  nosound();
  return(0);
}

/*
 *
 *
 */
void set_current_type(int type)
{
  if (!type){
          Current_Type = VOLTAGE_OUTPUT;
```

```
        select_relay(8,0);
        select_relay(10,0);
        select_relay(12,0);
        deselect_relay(8,1);
        deselect_relay(10,1);
        deselect_relay(12,1);

        set_vfsg(0.0,CURRENT_GAIN_EVENT);
/*      set_v_gain(voltage_gain_table[0],CURRENT_GAIN_EVENT);*/
        Current_Gain = 1.0;

  }else {
        Current_Type = AMP_OUTPUT;
        select_relay(8,1);
        select_relay(10,1);
        select_relay(12,1);
        deselect_relay(8,0);
        deselect_relay(10,0);
        deselect_relay(12,0);
        set_vfsg(0.0,CURRENT_GAIN_EVENT);
/*      set_c_gain(current_gain_table[0],CURRENT_GAIN_EVENT);*/
        Current_Gain = 1.0;

  }


}
```

anacomm.h

```
/* address offset from base defined by the dip switch */
#define ACCS_OFFSET  0x0000
#define AVCS_OFFSET  0x0080
#define BCCS_OFFSET  0x0100
#define BVCS_OFFSET  0x0180
#define CCCS_OFFSET  0x0200
#define CVCS_OFFSET  0x0280
#define DCCS_OFFSET  0x0300
#define DVCS_OFFSET  0x0380

#define AVR_OFFSET  0x0400
#define ACR_OFFSET  0x0480
#define BVR_OFFSET  0x0500
#define BCR_OFFSET  0x0580
#define CVR_OFFSET  0x0600
#define CCR_OFFSET  0x0680
#define DVR_OFFSET  0x0700
#define DCR_OFFSET  0x0780

/* defines for external control lines */
#define  BUS8       0x0
#define  BUS16      0x1

#define  NORMAL     0x0
#define  SLEEP      0x2

#define  AMPMOD     0x4
#define  NOAMPMOD   0x0

#define  CLKSYNCH   0x0
#define  NOCLKSYNCH 0x8

/* address pointers for dds chips */
extern unsigned char far *accs;
extern unsigned char far *avcs;
extern unsigned char far *bccs;
extern unsigned char far *bvcs;
extern unsigned char far *cccs;
extern unsigned char far *cvcs;
extern unsigned char far *dccs;
extern unsigned char far *dvcs;

/* address pointers for control registers */
extern unsigned char far *acr;
extern unsigned char far *avr;
extern unsigned char far *bcr;
extern unsigned char far *bvr;
```

A000098

2 anacomm.h

```
extern unsigned char far *ccr;
extern unsigned char far *cvr;
extern unsigned char far *dcr;
extern unsigned char far *dvr;

/*
 *  Init will assign the addresses to the address pointers,
 *  reset the dds chips, and set the control lines to 0
 */
init(unsigned int);

/*
 * This routine will write the 32 bit number write, one byte at a time msb
 * first to the address specified by ddsport
 */
int writepareg(unsigned long int write,unsigned char far *ddsport);

/*
 * select sleep will change the sleep line in the control
 * register
 */
int selectsleep(int sleep, unsigned  char far *creg);

/*
 * select frequency will change the frequency line in the control
 * register
 */
int selectfreq(int freq, unsigned  char far *creg);

/*
 * strobeload will toggle hi-lo the load line in the control
 * register
 */
int strobeload(unsigned  char far *creg);

/*
 * strobereset will toggle hi-lo the reset line in the control
 * register
 */
int strobereset(unsigned  char far *creg);


/*
 *  set_clock_freq will modify clock_freq the global var which holds
 *  the variable from which frequency is calculated.
 */
int set_clock_freq(double frequency);
```

A000099 anacomm.h

```
/*
 *  get_clock_freq will return the value clock_freq the global var which holds
 *  the variable from which frequency is calculated.
 */
double get_clock_freq(void);

/*
 * This sets up the transfer control pins and then strobes the load line.
 * It transfers the contents of the parallel register to the destination
 * register specified by the tcontrol pins
 */
int transfer(unsigned char tcontrol,unsigned char far *creg);

/*
 * Simple Delay
 */
int wait(void);

/*
 * set control will set the internal control register of the dds chip specified
 * by ddsport the associated external control register defined by creg is used
 * to transfer the information to the internal control reg from the parallel
 * assembly register
 */
int setcontrol(int control, unsigned char far *ddsport,unsigned  char far *creg);

/*
 *  setphase will set the internal control phase accummulator register of the dds chip specified
 * by ddsport. The associated external control register defined by creg is used
 * to transfer the information to the phase acc. reg from the parallel
 * assembly register.  phase offset is the phase offset in
 */
int setphase(double phase, unsigned char far *ddsport,unsigned  char far *creg);

/*
 *  setamplitude will set the internal amplitude register of the dds chip specified
 * by ddsport. The associated external control register defined by creg is used
 * to transfer the information to the amplitude reg from the parallel
 * assembly register.  iamp is inphase component between +/- 1.0 qamp is quadrature
 * component between +/- 1.0
 */
int setamplitude(double qamp,double iamp, unsigned char far *ddsport,unsigned  char far *creg);

/*
 * setfreq0 will set the internal frequency 0 register of the dds chip specified
 * by ddsport. The associated external control register defined by creg is used
```

A000100

[redacted]

4 anacomm.h

```
 * to transfer the information to the frequency 0 reg from the parallel
 * assembly register.  frequency is defined in hertz range is 0 to clkfreq/2
 */
double setfreq0(double frequency,unsigned char far *ddsport,unsigned  char far *creg);

/*
 * setfreq1 will set the internal frequency 1 register of the dds chip specified
 * by ddsport. The associated external control register defined by creg is used
 * to transfer the information to the frequency 1 reg from the parallel
 * assembly register.  frequency is defined in hertz range is 0 to clkfreq/2
 */
double setfreq1(double frequency,unsigned char far *ddsport,unsigned  char far *creg);

/*
 *
 *
 *
 */
int assign_channel_phase(unsigned char far *channel, double data);

/*
 *
 *
 *
 */
int assign_channel_amplitude(unsigned char far *channel, double data);

/*
 *
 *
 *
 */
int assign_channel_frequency(unsigned char far *channel, double data);

/*
 *
 *
 *
 */
int assign_channel_control(unsigned char far *channel, int data);

/*
 *
 *
 *
 */
double get_channel_phase(unsigned char far *channel);
```

A000101 anacomm.h

```
/*
 *
 *
 *
 */
double get_channel_amplitude(unsigned char far *channel);

/*
 *
 *
 *
 */
double get_channel_frequency(unsigned char far *channel);

/*
 *
 *
 *
 */
int get_channel_control(unsigned char far *channel);

/*
 *
 * This function will return address offset
 *
 */
unsigned int get_channel_offset(unsigned char far *channel);
```

[redacted]

dgctrl.h

```
/*
 * Name:         DGCTRL.C
 *
 * Company:      Nomadic Technologies
 * Author:       Jim Slater
 * Date:         4/22/94
 *
 *
 * Desciption:   This module provides an interface to the Nomadic Technologies'
 *               Rev 1.0 Digital Interface Board
 *
 * The port assignments are for 5130 PIA FPGA
 *
 * OUTPUTS
 *
 * porta[0..7]            Status Tester[0..7]
 * portb[0..7]            Status Tester[8..15]
 * portc[0..7]            Variac Data[0..7]
 * portd[0..5]            Variac Data[8..13]
 * portd[6]               Variac Servo Inhibit
 *
 * INPUTS
 *
 * porte[0..7]            Control Tester[0..7]
 * portf[0]               Variac Goal Reached (If Jumpered)
 * portf[1..5]            Unused
 * portf[6]               Manual Reset
 * portf[7]               Run
 *
 *
 * The port assignments are for 5130 pcbus/digitsal i/o FPGA
 *
 *
 * OUTPUTS
 *
 * port2a[0..7]           Unused
 * port2b[0..7]           Unused
 * port2c[0..7]           Unused
 *
 * INPUTS
 *
 * none
 *
 */

/*
 *  Init digital ports wil assign the address to the address pointer
```

A000103

[redacted]

dgctrl.h

2

```
 */
void initdigitalports(unsigned int base);

/*
 *
 */
void set_outbit(int bit);

/*
 *
 */
void clear_outbit(int bit);

/*
 *
 */
int setoutportbit(int bit, int data);

/*
 *
 */
unsigned int getoutportbit(int bit);

/*
 *
 */
unsigned int getoutport(void);

/*
 *
 */
int setoutport(unsigned int data);

/*
 *
 */
unsigned int getinportbit(int bit);

/*
 *
 */
unsigned int getinport(void);

/*
 *
 */
unsigned int getvariac(void);
```

A000104

[redacted]

dgctrl.h

3

```
/*
 *
 */
int setvariac(unsigned int data);
```

[redacted]

gltime.h

[redacted]

```
/****************************************************

        set the timer to its mode 2

/***************************************************/
void timer_open(void);


/****************************************************

        read the current value of the timer

/***************************************************/
long timer_read(void);


/****************************************************

        set the timer to its default settings

/***************************************************/
void timer_close(void);
```

A000106 preamp.h

```
/*
 * Name:        PREAMP.C
 *
 * Company:     Nomadic Technologies
 * Author:      Jim Slater
 * Date:        4/22/94
 *
 *
 * Desciption:  This module provides an interface to the Nomadic Technologies'
 *              Rev 1.0 Digital Preamp Board
 *
 * The port assignments are for 5130 preampan analog control FPGA
 *
 * DAC SECTION OUTPUTS
 *
 * dacdatal[0..7]         dacdata[0..7]   DAC databits 0 - 7
 * dacdatah[0..5]         dacdata[8..13]  DAC databits 8-13
 * dacdatah[6..7]         UNUSED
 * dacctrl[0..6]          wr for the six DACS
 * dacctrl[7]             ldac for ALL six DACS
 *
 * DAC SECTION INPUTS
 *
 * none
 *
 * AD SECTION OUTPUTS
 *
 * adctrl[0..2]          muxaddress[0..2]  mux address bits 0-2
 * adctrl[3]             analog switch for RMS feedback
 * adctrl[4]             analog switch for direct signal feedback
 * adctrl[5]             /cs AD control pin - low for stand alone
 * adctrl[6]             R//C AD control pin - toggle for stand alone
 * adctrl[7]             ce AD control pin - high for stand alone
 *
 *
 * AD SECTION INPUTS
 *
 * addatal[0..7]          addata[0..7]   AD databits 0-7
 * addatah[0..4]          addata[8..11]  AD databits 8-11
 * addatah[5..7]          UNUSED
 *
 *
 * The port assignments are for 5130 preampdg digital control FPGA
 *
 *
 * RELAY SECTION OUTPUTS
 *
```

preamp.h

```
 * relayctrll[0..5]       relay control for relays 0 - 5
 *                                               evens are used for output enable on voltage amps
 *                        odds are unused on voltage amps
 *                                               evens are used for calibration on current amps
 *                                               odds are used for output enable on current amps
 * relayctrll[6..7]       UNUSED
 * relayctrlh[0..5]       relay control for relays 6 - 11
 *                                               evens are used for output enable on voltage amps
 *                                               odds are unused on voltage amps
 *                                               evens are used for calibration on current amps
 *                                               odds are used for output enable on current amps
 * relayctrlh[6..7]       UNUSED
 *
 * RELAY SECTION INPUTS
 *
 * none
 *
 * ID SECTION OUTPUTS
 *
 * none
 *
 * ID SECTION INPUTS
 *
 * id[0..7]               board id inputs set by dip switch 3
 *
 */

/*
 *  Init will assign the addresses to the address pointers,
 */
unsigned char preamp_init(unsigned int base, int id);

/*
 *  select dac will pull the wr line for the specified dac low
 *  valid dac num are 0-6
 */
void select_dac(int dac_num, int id);

/*
 *  deselect dac will pull the wr line for the specified dac high
 *  valid dac num are 0-6
 */
void deselect_dac(int dac_num, int id);

/*
 *  select relay will energize the coil for the selected relay
 *  valid relay numbers are 0-15
```

[redacted]

preamp.h

3

```
 */
void select_relay(int relay_num, int id);

/*
 *  deselect relay will deenergize the coil for the selected relay
 *  valid relay numbers are 0-15
 */
void deselect_relay(int relay_num, int id);

/*
 *  select ldac will pull the ldac line low
 */
void select_ldac(int id);

/*
 *  deselect ldac will pull the ldac line high
 */
void deselect_ldac(int id);

/*
 *  toggle ldac will pull the ldac line low then high
 */
void toggle_ldac(int id);

/*
 *  set dac data will set the 14 data bits of dacs
 */
void set_dac_data(int data, int id);

/*
 *  get dac data will return the 14 data bits of dacs
 */
int get_dac_data(int id);

/*
 *  write to dac will write and data and toggle the control lines
 */
void write_to_dac(int data, int dac_num, int id);

/*
 *  set vfsg
 *
 */
void set_vfsg(double value,unsigned char type);

/*
 *  set fsg
```

A000109 preamp.h

```
 *
 */
void set_fsg_channel(double value,int channel,unsigned char id);

/*
 *  get fsg
 *
 */
int get_fsg_channel(int channel,unsigned char id);

/*
 *  set cfsg
 *
 */
void set_cfsg(double value,unsigned char type);

/*
 *  correct DAC
 */
int correct_dac(int correction,int channel,int id);

/*
 *  get dac correction
 *
 */
int get_dac_correction( double error);

/*
 *  get ad average
 *
 */
double get_ad_average(int channel,int id);

/*
 *  get calibration error
 *
 */
double get_cal_error( int full_scale_value,int channel,int id);

/*
 *   calibrate channel level
 */
int calibrate_channel_level(int level,int channel,int id);


/*
 *  save fsg file
```

A000110 preamp.h

```
 *
 */
int save_fsg_file(int channel,int id);

/*
 *  load fsg file
 *
 */
int load_fsg_file(int channel,int id);

/*
 *  load cal file
 *
 */
int load_cal_file(int channel,int id);


/*
 *  calibrate channel
 *
 */
void calibrate_channel(int channel,int id,int max_level);

/*
 *  set gain
 *
 */
void setgain(unsigned int value,unsigned char type);

/*
 *  set c  gain
 *
 */
void set_c_gain(unsigned int value,unsigned char type);

/*
 *  set v  gain
 *
 */
void set_v_gain(unsigned int value,unsigned char type);

/*
 *  select AD(mux) channel will set the address lines
 *  on the DG508 MUX
 */
void select_ad_channel(int channel, int id);
```

A000111

[redacted]

preamp.h

6

```
/*
 *  set AD mode 0 = no connect 1 = RMS 2 = Direct
 */
void set_ad_mode(int mode, int id);

/*
 *  select rc will pull the rc line low
 */
void select_rc(int id);

/*
 *  deselect rc will pull the rc line high
 */
void deselect_rc(int id);

/*
 *  toggle rc will pull the rc line low then high
 */
void toggle_rc(int id);

/*
 *  get ad data will return the 12 data bits of the AD
 */
int get_ad_data(int id);


/*
 *  read_ad will toggle the control lines and read the data
 */
int read_ad(int id);
```

[redacted]

sse.h

1

```
int main(void);

/*
 *
 *
 */
int reset_all_channels(void);

/*
 *
 *
 */
int wait_for_cycle(int cycle_cnt, long begin);

/*
 *
 *
 */
int reset_wait_for_cycle(void);

/*
 *
 *
 */
long get_end_timer_cnt(int end_cnt, long begin);

/*
 *
 *
 */
int initialize_control_tester(void);

/*
 *
 *
 */
int initialize_script(void);

/*
 *
 *
 */
/***********************************************************************
************************************************************************
     This function will read script data from the disk drive
```

2 sse.h

```
**********************************************************************
*********************************************************************/
int read_script(char *filename, int trace_enable);


/*
 *
 *
 */
int execute_script(int);

/*
 *
 *
 */
setup(void);

/*
 *
 *
 */
reset_active_channel(void);

/*
 *
 *
 */
signal_close(void);



/**************************************************************
**************************************************************

**************************************************************
*************************************************************/
int get_answer(void);


/**********************************************************************
**********************************************************************
  This function will set up the address and call the init function
**********************************************************************
*********************************************************************/
int address_init(void);
```

A000114

[redacted]

sse.h

[redacted]

```
/***********************************************************************
************************************************************************
  This function will set up the address and call the init function
************************************************************************
***********************************************************************/
int main_menu(void);


/***********************************************************************
************************************************************************
  This function will set up the address and call the init function
************************************************************************
***********************************************************************/
int channel_menu(void);

/***********************************************************************
************************************************************************
  This function will set up the address and call the init function
************************************************************************
***********************************************************************/
int control_menu(void);

/***********************************************************************
************************************************************************
        This function will dispaly the header information
************************************************************************
***********************************************************************/
int display_header(void);

/***********************************************************************
************************************************************************
                     This function will dispaly the menu
************************************************************************
***********************************************************************/
int display_main_menu(void);

/***********************************************************************
************************************************************************
                     This function will dispaly the menu
************************************************************************
***********************************************************************/
```

sse.h

```
int display_address_menu(void);

/**********************************************************************
**********************************************************************
                  This function will dispaly the menu
**********************************************************************
*********************************************************************/
int display_initialize_menu(void);

/**********************************************************************
**********************************************************************
                  This function will dispaly the menu
**********************************************************************
*********************************************************************/
int display_enterscript_menu(void);

/**********************************************************************
**********************************************************************
                  This function will dispaly the menu
**********************************************************************
*********************************************************************/
int display_editscript_menu(void);.

/**********************************************************************
**********************************************************************
                  This function will dispaly the menu
**********************************************************************
*********************************************************************/
int display_readscript_menu(void);

/**********************************************************************
**********************************************************************
                  This function will dispaly the menu
**********************************************************************
*********************************************************************/
int display_savscript_menu(void);

/**********************************************************************
**********************************************************************
                  This function will dispaly the menu
**********************************************************************
*********************************************************************/
int display_control_menu(void);

/*********************************************************************
```

A000116

[redacted]

sse.h

```
************************************************************************
                  This function will dispaly the menu
************************************************************************
***********************************************************************/
int display_sleep_menu(void);

/***********************************************************************
************************************************************************
                  This function will dispaly the menu
************************************************************************
***********************************************************************/
int display_channel_menu(void);

/***********************************************************************
************************************************************************
                  This function will dispaly the menu
************************************************************************
***********************************************************************/
int display_current_channel(void);

/***********************************************************************
************************************************************************
                  This function will return the active menu offset
************************************************************************
***********************************************************************/
unsigned int get_current_channel_offset(void);


/*
 *
 *
 */
int makebeep(int tone,int duration);


/***********************************************************************
************************************************************************

************************************************************************
***********************************************************************/
int check_filename_ext(char *filename);


/***********************************************************************
************************************************************************

************************************************************************
```

6 sse.h

```
**********************************************************************/
int append_filename_ext(char *filename, char *ext);


/*********************************************************************
**********************************************************************

**********************************************************************
**********************************************************************/
int get_filename_base(char *filename, char *base);


/*********************************************************************
**********************************************************************
                  This function will return address offset
**********************************************************************
**********************************************************************/
unsigned int get_channel_offset(unsigned char far *channel);

/*********************************************************************
**********************************************************************

**********************************************************************
**********************************************************************/
char * get_delimiter_pos(char *datastring, char delimiter);

/*
 *
 *
 */
void set_current_type(int type);
```

A000118

What is claimed is:

1. An apparatus for simultaneously generating more than one analog signal for use in testing AC power lines, comprising:

a plurality of monolithic direct digital synthesis (MDDS) circuit, each producing an analog MDDS output signal having a frequency less than 100 Hz and each having at least one digital MDDS input for specifying a desired signal characteristic of the MDDS output signal;

at least one clock, generating one clock signal coupled to all the MDDS circuits, the clock having a frequency greater than 10 MHz; and a microprocessor executing a computer program that communicates desired signal characteristics to the MDDS inputs, wherein at least one of the desired signal characteristics is a command for a frequency less than 100 Hz.

2. The apparatus recited in claim 1, further comprising, for each MDDS circuit, a phase locked loop circuit coupling the clock signal and the MDDS circuit.

3. The apparatus recited in claim 1, further comprising an operational amplifier having an input driven by an MDDS output signal and having an output for driving a load.

4. The apparatus recited in claim 1, wherein the computer program obtains the desired signal characteristics by reading a script stored on a mass storage device coupled to the microprocessor.

5. The apparatus recited in claim 1, wherein the MDDS circuits have modulation control inputs, and wherein the microprocessor communicates desired phase, frequency and amplitude characteristics of the signal outputs to the modulation control inputs.

6. An apparatus for simultaneously generating more than one analog signal for use in testing power line devices, comprising:

a plurality of monolithic direct digital synthesis (MDDS) circuit, each having an analog MDDS output signal and at least one digital MDDS input for specifying a desired characteristic of the MDDS output signal, the MDDS output signal having a frequency less than 100 Hz;

a single clock signal coupled to all the MDDS circuits having a frequency greater than 10 MHz;

each of the MDDS circuits including a phase locked loop circuit coupling the clock signal and the MDDS circuit;

an interface coupled to the MDDS inputs for communicating desired signal characteristics to the MDDS inputs;

a computer program executed by a microprocessor coupled to the interface for controlling the interface in response to desired signal characteristics entered at a computer terminal coupled to the microprocessor.

7. The apparatus recited in claim 6, further including an operational amplifier having an input driven by the MDDS output signal and having an output for driving a load.

8. The apparatus recited in claim 6, wherein the MDDS devices have modulation control inputs, and wherein the microprocessor communicates desired phase, frequency and amplitude characteristics of the signal outputs to the modulation control inputs.

9. An apparatus for generating multiple low-frequency analog signals, comprising:

plurality of monolithic direct digital synthesis (MDDS) circuit, each having an analog MDDS output signal of a frequency less than 100 Hz and at least one MDDS input for specifying a feature of the MDDS output signal;

a single high-frequency clock signal of a frequency greater than 10 MHz coupled to all the MDDS circuits;

a phase locked loop (PLL) circuit coupled between the clock signal and the MDDS circuit for each of the MDDS circuits;

an interface coupled to the MDDS inputs for communicating desired signal features to the MDDS inputs; and a computer terminal executing a computer program by the terminal for controlling the interface in response to features of each of the MDDS output signals entered at the terminal.

10. The apparatus recited in claim 9, further including an operational amplifier having an input driven by the MDDS output signal and having an output for driving a load.

11. The apparatus recited in claim 9, adapted for use in testing power line monitoring devices, wherein the high frequency clock signal is greater than 10 MHz and the low frequency MDDS output signals are less than 100 Hz.

12. The apparatus recited in claim 9, wherein the MDDS devices have modulation control inputs, and wherein the microprocessor communicates desired phase, frequency and amplitude characteristics of the signal outputs to the modulation control inputs.

* * * * *

UNITED STATES PATENT AND TRADEMARK OFFICE

CERTIFICATE OF CORRECTION

PATENT NO. : 5,604,679

DATED : Feb. 18, 1997

INVENTOR(S) : James C. Slater

It is certified that error appears in the above-indentified patent and that said Letters Patent is hereby corrected as shown below:

| Claim | COLUMN | LINE | |
|---|---|---|---|
| 9 | 250 | 17 | insert --a-- before plurality |

Signed and Sealed this

Fourth Day of November, 1997

Attest:

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,604,679

DATED : February 18, 1997

INVENTOR(S) : James C. Slater

It is certified that error appears in the above-identified patent and that said Letters Patent is hereby corrected as shown below:

| Claim | COLUMN | LINE | |
|---|---|---|---|
| 1 | 249 | 3 | delete "lines" and insert --devices-- |

Signed and Sealed this

Third Day of March, 1998

Attest:

BRUCE LEHMAN

Attesting Officer

Commissioner of Patents and Trademarks

UNITED STATES PATENT AND TRADEMARK OFFICE

CERTIFICATE OF CORRECTION

PATENT NO. : 5,604,679

DATED : February 18, 1997

INVENTOR(S) : James C. Slater

It is certified that error appears in the above-identified patent and that said Letters Patent is hereby corrected as shown below:

| Claim | Column | Line | |
|---|---|---|---|
| 1 | 249 | 3 | delete " lines " and insert -- line devices --. |

This certificate supersedes Certificate of Correction issued March 3, 1998.

Signed and Sealed this

Seventh Day of July, 1998

Attest:

BRUCE LEHMAN

*Attesting Officer*

*Commissioner of Patents and Trademarks*